US008228512B2

(12) United States Patent
Ogura et al.

(10) Patent No.: US 8,228,512 B2

(45) Date of Patent: Jul. 24, 2012

(54) IMAGE FORMING APPARATUS, IMAGE FORMING SYSTEM, IMAGE FORMING METHOD, CONTROL PROGRAM FOR ELIMINATING CONVEYANCE FAILURE, AND INFORMATION RECORDING MEDIUM HAVING RECORDED THEREON CONTROL PROGRAM FOR ELIMINATING CONVEYANCE FAILURE

(75) Inventors: Yoshimitsu Ogura, Kanagawa (JP); Tetsuyoshi Nakata, Kanagawa (JP); Shigeru Yoshigai, Kanagawa (JP); Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 692 days.

(21) Appl. No.: 12/441,539

(22) PCT Filed: May 12, 2008

(86) PCT No.: PCT/JP2008/059097

§ 371 (c)(1), (2), (4) Date: Mar. 17, 2009

(87) PCT Pub. No.: WO2009/016874

PCT Pub. Date: Feb. 5, 2009

(65) Prior Publication Data

US 2009/0237744 A1 Sep. 24, 2009

(30) Foreign Application Priority Data

Jul. 27, 2007 (JP) ................................ 2007-196252

(51) Int. Cl.

| | |
|---|---|
| ***G06K 15/00*** | (2006.01) |
| ***H04N 1/36*** | (2006.01) |
| *B41J 29/393* | (2006.01) |
| *B41J 2/01* | (2006.01) |
| *B41J 2/325* | (2006.01) |
| *B65H 7/00* | (2006.01) |

(52) U.S. Cl. ....... 358/1.12; 358/420; 358/421; 358/422; 358/423; 358/468; 358/498; 347/19; 347/104; 347/164; 347/215; 347/249; 399/21; 399/9; 271/256

(58) Field of Classification Search ........................ None
See application file for complete search history.

(56) References Cited

U.S. PATENT DOCUMENTS 5,721,581 A * 2/1998 Saito et al. .................... 347/249

(Continued)

FOREIGN PATENT DOCUMENTS

JP 6 64274 3/1994

(Continued)

OTHER PUBLICATIONS

Office Action mailed Mar. 21, 2012, in Japanese Patent Application No. 2007-196252, filed Jul. 27, 2007.

*Primary Examiner* — Satwant Singh

(74) *Attorney, Agent, or Firm* — Oblon, Spivak, McClelland, Maier & Neustadt, L.L.P.

(57) ABSTRACT

An image forming apparatus is disclosed that forms an image based on a control signal from an image processing controlling unit that processes input image information into image data. The apparatus includes a carriage that moves in a main scanning direction in accordance with the control signal; a conveyance unit that conveys a recording medium in a sub-scanning direction; an output detection unit that detects motor outputs of the carriage at any plural points when the carriage moves at a constant speed; and a jamming determination unit that compares an average value of the motor outputs of the carriage between the plural points with a predetermined tolerance to determine a conveyance failure.

6 Claims, 34 Drawing Sheets

U.S. PATENT DOCUMENTS

| | | | | |
|---|---|---|---|---|
| 6,246,484 | B1 * | 6/2001 | Shimamura et al. | 358/1.12 |
| 7,463,000 | B2 * | 12/2008 | Akiyama | 318/560 |
| 7,812,975 | B2 * | 10/2010 | Onuma | 358/1.12 |
| 2005/0007410 | A1 * | 1/2005 | Murayama et al. | 347/19 |
| 2006/0192804 | A1 | 8/2006 | Nakata et al. | |
| 2007/0229013 | A1 * | 10/2007 | Hayashi et al. | 318/466 |
| 2008/0141076 | A1 * | 6/2008 | Hu et al. | 714/45 |

FOREIGN PATENT DOCUMENTS

| | | |
|---|---|---|
| JP | 7-9725 | 1/1995 |
| JP | 2738802 | 1/1998 |
| JP | 2000 118067 | 4/2000 |
| JP | 2003-211769 | 7/2003 |
| JP | 2006 240026 | 9/2006 |
| JP | 2007-55030 | 3/2007 |

* cited by examiner

IMAGE FORMING APPARATUS, IMAGE FORMING SYSTEM, IMAGE FORMING METHOD, CONTROL PROGRAM FOR ELIMINATING CONVEYANCE FAILURE, AND INFORMATION RECORDING MEDIUM HAVING RECORDED THEREON CONTROL PROGRAM FOR ELIMINATING CONVEYANCE FAILURE

TECHNICAL FIELD

The present invention relates to an image forming apparatus that includes a carriage moving in a main scanning direction and a recording medium moving in a sub-scanning direction and has a function of comparing the values of motor outputs at the movement of the carriage to determine a conveyance failure, and it also relates to an image forming system, an image forming method, a control program for eliminating a conveyance failure, and an information recording medium having the control program recorded thereon.

BACKGROUND ART

Known image forming apparatuses operate to eject ink droplets while moving a carriage in a main scanning direction so as to form images on a recording medium moving in a sub-scanning direction.

In the image forming apparatuses having such a configuration, if the moving operation of the carriage is continued in a case where the clogging of a recording medium (recording sheet) i.e., "jamming" as a conveyance failure occurs, a heavy load is applied to the carriage and peripheral members thereof.

In view of this problem, a variety of techniques have been proposed with respect to image forming apparatuses that have a function of informing the user of the occurrence of the conveyance failure (jamming) and a method of eliminating an improper conveyance sheet so that the user is urged to eliminate a jammed sheet. However, the proposed techniques have a problem in detecting the jamming as early as possible to adequately stop the carriage.

A known jamming detection method determines the conveyance failure (jamming) if the output values of a carriage driving motor exceed a predetermined threshold in accordance with a characteristic that the output (current/voltage) values of the carriage driving motor for controlling speed fluctuate as the carriage comes in contact with foreign matter such as a recording medium (sheet).

Specifically, the jamming detection method has been disclosed in which the output (current/voltage) values of the driving motor at plural points when the carriage moves at a constant speed are compared with those of the driving motor at corresponding points when the carriage was previously driven in the same direction. Then, a determination is made of the occurrence of the conveyance failure if the difference between them exceeds a predetermined threshold (see, for example, Patent Document 1).

In this jamming detection method, however, it is necessary to set the threshold considering a margin about a fluctuation in motor output in accordance with variations in mechanism, ambient environment, time, etc. If the margin is too small, the fluctuation in the motor output at a normal operation where no jamming occurs is erroneously detected as the jamming. On the other hand, if the margin is too large, it takes time for the value of the motor output to exceed the threshold, resulting in a delay in detecting the jamming.

For this reason, in many cases, it is difficult to adequately set a margin during an actual operation, and there is a limit in accuracy for detecting the jamming for practical use.

Patent Document 1: JP-B2-2738802

DISCLOSURE OF THE INVENTION

In view of the above problem, the present invention may provide an image forming apparatus, which ejects ink droplets while moving a carriage in a main scanning direction so as to form images on a recording medium, the image forming apparatus being capable of determining the occurrence of jamming at an early stage by improving a jamming occurrence detection function.

According to a first aspect of the present invention, an image forming apparatus is provided that forms an image based on a control signal from an image processing controlling unit that processes input image information into image data. The apparatus comprises a carriage that moves in a main scanning direction in accordance with the control signal; a conveyance unit that conveys a recording medium in a sub-scanning direction; an output detection unit that detects motor outputs of the carriage at any plural points when the carriage moves at a constant speed; and a jamming determination unit that compares an average value of the motor outputs of the carriage between the plural points with a predetermined tolerance to determine a conveyance failure.

According to a second aspect of the present invention, an image forming apparatus is provided that forms an image based on a control signal from an image processing controlling unit that processes input image information into image data. The apparatus comprises a carriage that moves in a main scanning direction in accordance with the control signal; a conveyance unit that conveys a recording medium in a sub-scanning direction; an output detection unit that detects motor outputs of the carriage at any plural points when the carriage moves at a constant speed; and a jamming determination unit that compares a most frequent value of the motor outputs of the carriage between the plural points with a predetermined tolerance to determine a conveyance failure.

According to a third aspect of the present invention, an image forming apparatus is provided that forms an image based on a control signal from an image processing controlling unit that processes input image information into image data. The apparatus comprises a carriage that moves in a main scanning direction in accordance with the control signal; a conveyance unit that conveys a recording medium in a sub-scanning direction; an output detection unit that detects motor outputs of the carriage at any plural points when the carriage moves at a constant speed; and a jamming determination unit that compares a difference between a maximum value and a minimum value of the motor outputs of the carriage between the plural points with a predetermined tolerance to determine a conveyance failure.

Preferably, the determination of the conveyance failure with the jamming determination unit may be performed based on either a history of values of the motor outputs until any point during movement of the carriage at a constant speed or the history of the values of the motor outputs after the movement of the carriage at the constant speed.

Preferably, an occurrence of jamming of the carriage may be determined when the number of times determined as the conveyance failure by the jamming determination unit is equal to or greater than a predetermined number.

Preferably, the tolerance may be set by appropriately combining a fluctuation in the values of the motor outputs when the carriage is caused to perform idle driving, an external environment, time degradation, and the history of the values of the motor output.

According to a fourth aspect of the present invention, an image forming method is provided that has a step of moving a carriage in a main scanning direction based on a control signal from an image processing controlling unit that processes input image information into image data and conveying a recording medium in a sub-scanning direction to perform printing. The method comprises the steps of detecting motor outputs of the carriage at any plural points when the carriage moves at a constant speed; and comparing an average value of the motor outputs of the carriage between the plural points with a predetermined tolerance to determine a conveyance failure.

According to a fifth aspect of the present invention, an image forming system is provided that comprises the image forming apparatus described above; and an inputting apparatus that transmits image information to the image forming apparatus.

According to a sixth aspect of the present invention, a conveyance failure detection program is provided that is applied to an image forming apparatus having a carriage that moves in a main scanning direction based on a control signal from an image processing controlling unit that processes input image information into image data, a conveyance unit that conveys a recording medium in a sub-scanning direction, an output detection unit that detects motor outputs of the carriage, and a jamming determination unit. The program comprises an instruction system that causes the output detection unit to detect the motor outputs of the carriage at any plural points when the carriage moves at a constant speed and the jamming determination unit to compare an average value of the motor outputs of the carriage between the plural points with a predetermined tolerance to determine a conveyance failure.

According to a seventh aspect of the present invention, an information recording medium is provided that has stored therein the conveyance failure detection program described above.

According to embodiments of the present invention, a reference value is determined based on an average value, a most frequent value, and a difference between maximum and minimum values, using as an index the history of motor outputs of a carriage moving at a constant speed. In addition, a tolerance is set based on this reference value to determine a conveyance failure. Therefore, a determination of jamming can be performed for practical use in consideration of influences of a fluctuation in the motor outputs due to variations in mechanism, time degradation, ambient environment, etc.

BEST MODE FOR CARRYING OUT THE INVENTION

Figure 1:
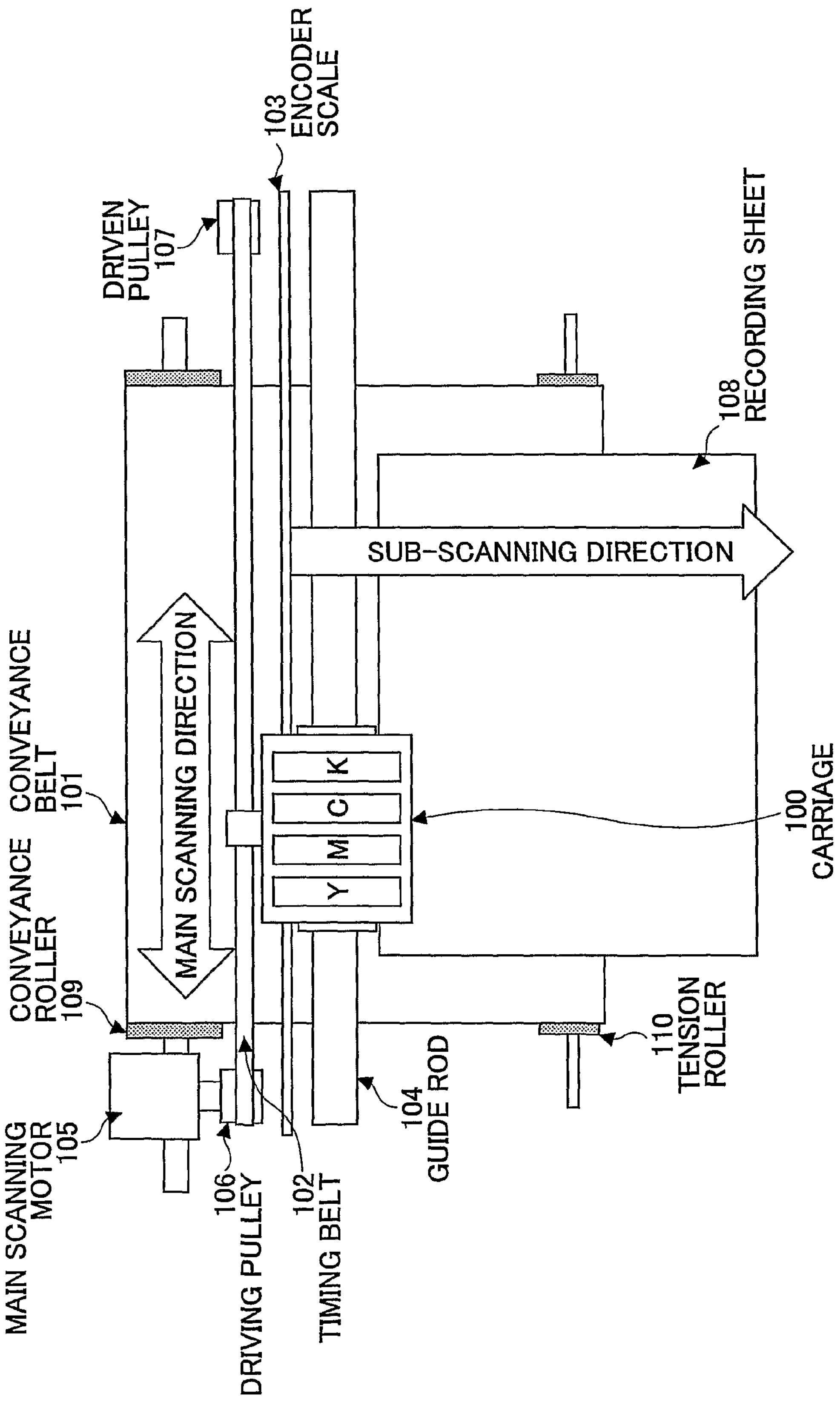
FIG. 1 shows a schematic plan view of an ink jet recording apparatus.
Figure 2:
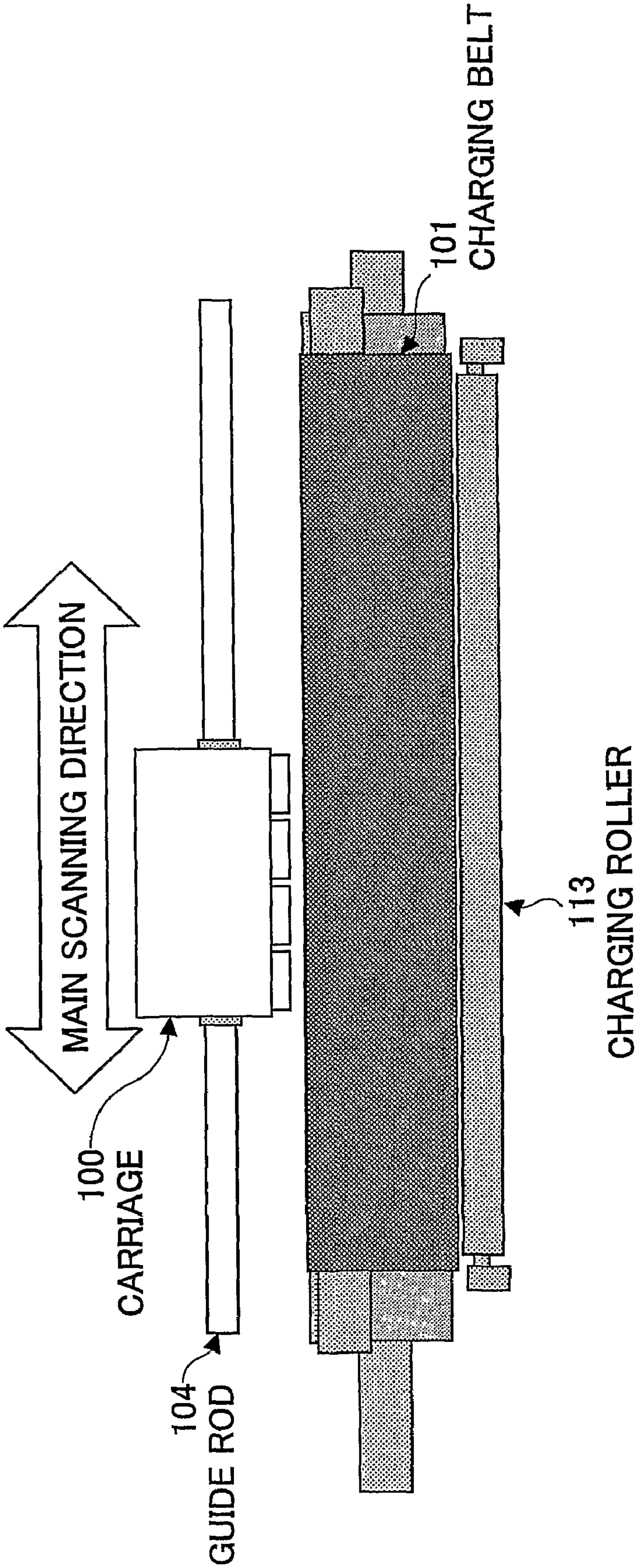
FIG. 2 shows a schematic front view of the ink jet recording apparatus.

FIG. 1 shows a schematic plan view of an ink jet recording apparatus as an example of an image forming apparatus of the present invention, and FIG. 2 shows a schematic front view of the ink jet recording apparatus.

The ink jet recording apparatus shown in FIG. 1 is equipped with an image processing controlling unit that processes image information transmitted from external apparatuses (such as computers that perform, for example, downloading of images) into image data, and it has a function of forming images based on a signal from the image processing controlling unit.

In other words, in accordance with the signal from the image processing controlling unit, the ink jet recording apparatus moves a carriage 100 having nozzles for ejecting ink droplets in a main scanning direction while conveying a recording medium (recording sheet) 108 in a sub-scanning direction so as to form images.

The carriage 100 is held by a guide rod 104 laterally bridging between left and right side plates (not shown) and is designed to move for scanning in the main scanning direction via a timing belt 102 suspended between a driving pulley 106 and a driven pulley 107.

The carriage 100 has a recording head composed of four liquid ejection heads from which ink droplets in colors, for example, of yellow (Y), cyan (C), magenta (M), and black (K) are ejected. In the recording head, nozzle arrays having plural ink ejection ports (nozzles) are aligned in the direction (sub-scanning direction) orthogonal to the main scanning direction.

As an ink jet head, publicly known ones are available. For example, it is possible to use an ink jet head having, as a pressure generation unit that generates pressure for ejecting liquid droplets, a piezoelectric actuator such as a piezoelectric element, a thermal actuator that makes use of a phase change due to the film boiling of liquid using an electric heat conversion element such as a heat element, a shape-memory-alloy actuator using a metal phase change due to a temperature change, an electrostatic actuator using an electrostatic force, etc.

The carriage 100 has an encoder scale 103 having slits formed along the main scanning direction.

In addition, the carriage 100 has an encoder sensor (not shown) that detects the slits of the encoder scale 103. The encoder scale 103 and the encoder sensor constitute a linear encoder that detects the position of the carriage 100 in the main scanning direction.

Furthermore, in the ink jet recording apparatus, the recording medium 108 is conveyed at a position opposing the recording head while being electrostatically attracted.

As a conveyance belt 101 that conveys the recording medium 108, an endless belt is available. The conveyance belt 101 is suspended between a conveyance roller 109 and a tension roller 110 and travels around in the belt conveyance direction (the sub-scanning direction in FIG. 1). The conveyance belt 101 is charged (charge application) with a charging roller 113 while being moved to travel.

The conveyance belt 101 may be of either a single-layer structure or a multiple-layer (two or more layers) structure. Because the conveyance belt 101 comes in contact with the recording medium 108 and the charging roller 113 in the case of the single-layer structure, the entire layer of the conveyance belt 101 must be made of an insulation material.

In the case of the multiple-layer structure, it is preferable that the layer on the side with which the recording medium 108 and the charging roller 113 come in contact be made of an insulation material, and that the layer on the side with which the recording medium 108 and the charging roller 113 do not come in contact be made of a conductive material.

Figure 3:
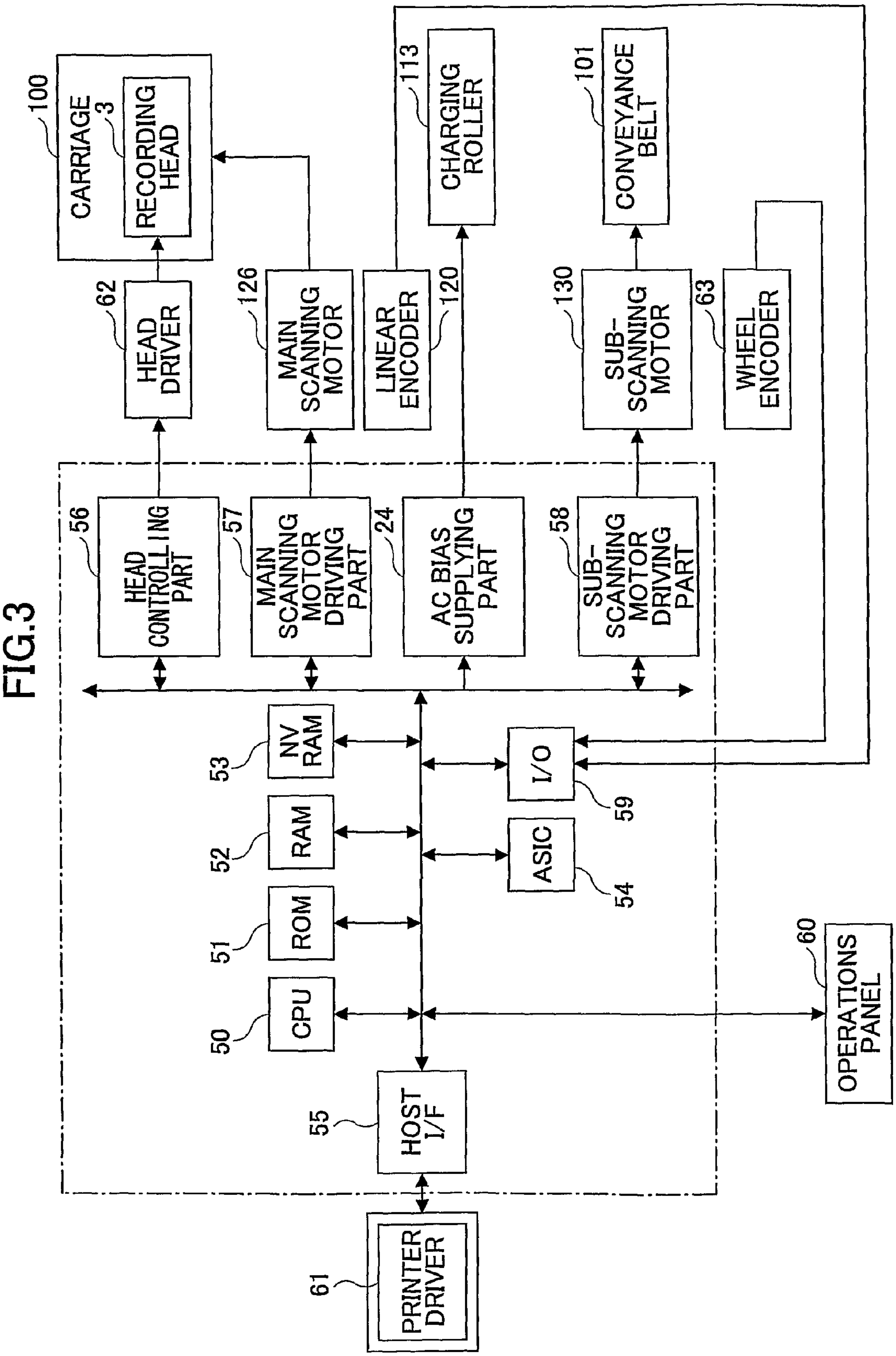
FIG. 3 shows a block diagram of a controlling part (image processing controlling unit) of the ink jet recording apparatus.

Referring next to a block diagram in FIG. 3, a description is made of an image processing controlling unit responsible for image forming processing in the ink jet recording apparatus.

The image processing controlling unit issues a predetermined control signal in accordance with image information input from the outside to drive the entire ink jet recording apparatus.

Specifically, the image processing controlling unit has a CPU 50 related to the conveyance operation of the recording medium and the moving operation of the recording head; a ROM 51 that stores programs executed by the CPU 50 and other fixation data; a RAM 52 that temporarily stores image information; a rewritable non-volatile random access memory (NVRAM) 53 that holds data even if the power of the ink jet recording apparatus is turned off; and an ASIC 54 that processes various signals to produce image information, images for rearrangement, and input/output signals controlling the entire ink jet recording apparatus.

In addition, the image processing controlling unit has a host I/F 55 that transmits and receives data signals to and from a host; a head controlling part 56 that generates driving waveforms for driving a recording head and outputs to a head driver 62 image data for selectively driving the pressure generation unit of the recording head and various associated data; a main scanning motor driving part 57 that drives a main scanning motor 126; a sub-scanning motor driving part 58 that drives a sub-scanning motor 130; an AC bias supplying part 24 that applies an AC bias to the charging roller 113; and an I/O part 59 to which detection pulses from the linear encoder 120 and a wheel encoder 63 and detection signals from other various sensors are input.

Moreover, the image processing controlling unit is connected to an operations panel 60 having an input function of inputting information necessary for the image forming apparatus and a display function of assisting users' operations.

In the image processing controlling unit, image data obtained through the printer driver 61 of a host such as an image processing apparatus or a predetermined personal computer, an image scanning apparatus such as an image scanner, and an image pickup apparatus such as a digital camera are received by the host I/F 55 via a cable or a network.

Then, printing image data of a receive buffer included in the host I/F 55 are read and analyzed by the CPU 50 and then subjected to necessary image processing, data arrangement processing, etc., by the ASIC 54. The printing image data are transferred to the head controlling part 56, and then image data and driving waveforms are output to the head driver 62 at required timings from the head controlling part 56.

Note that dot pattern data for outputting images may be generated, for example, by processing font data stored in the ROM 51. Alternatively, image data may be developed into bit map data by the printer driver 61 of the host and then transferred to the image forming apparatus.

In this example, dot pattern data are generated by the printer driver 61.

The driving waveform generation unit of the head controlling part 56 is composed of a D/A converter that D/A-converts the pattern data of a driving pulse stored in the ROM 51 and read by the CPU 50, an amplifier, etc., and it outputs a driving waveform formed of one driving pulse or plural driving pulses to the head driver 62.

The head driver 62 selectively applies the driving pulse constituting the driving waveform supplied from the driving waveform generation unit of the head controlling part 56 to the pressure generation unit of the recording head based on serially-input image data (dot pattern data) corresponding to one line of the recording head, to thereby drive the recording head.

Note that the head driver 62 has, for example, a shift register for inputting clock signals and serial data as image data; a latch circuit that latches the register values of the shift register with latch signals; a level conversion circuit (level shifter) that changes the levels of output values of the latch circuit; and an analog switch array (switch unit) that performs ON/OFF control with the level shifter. The head driver 62 controls the ON/OFF of the analog switch array to thereby selectively apply a required driving pulse included in the driving waveform to the pressure generation unit of the recording head.

Figure 4:
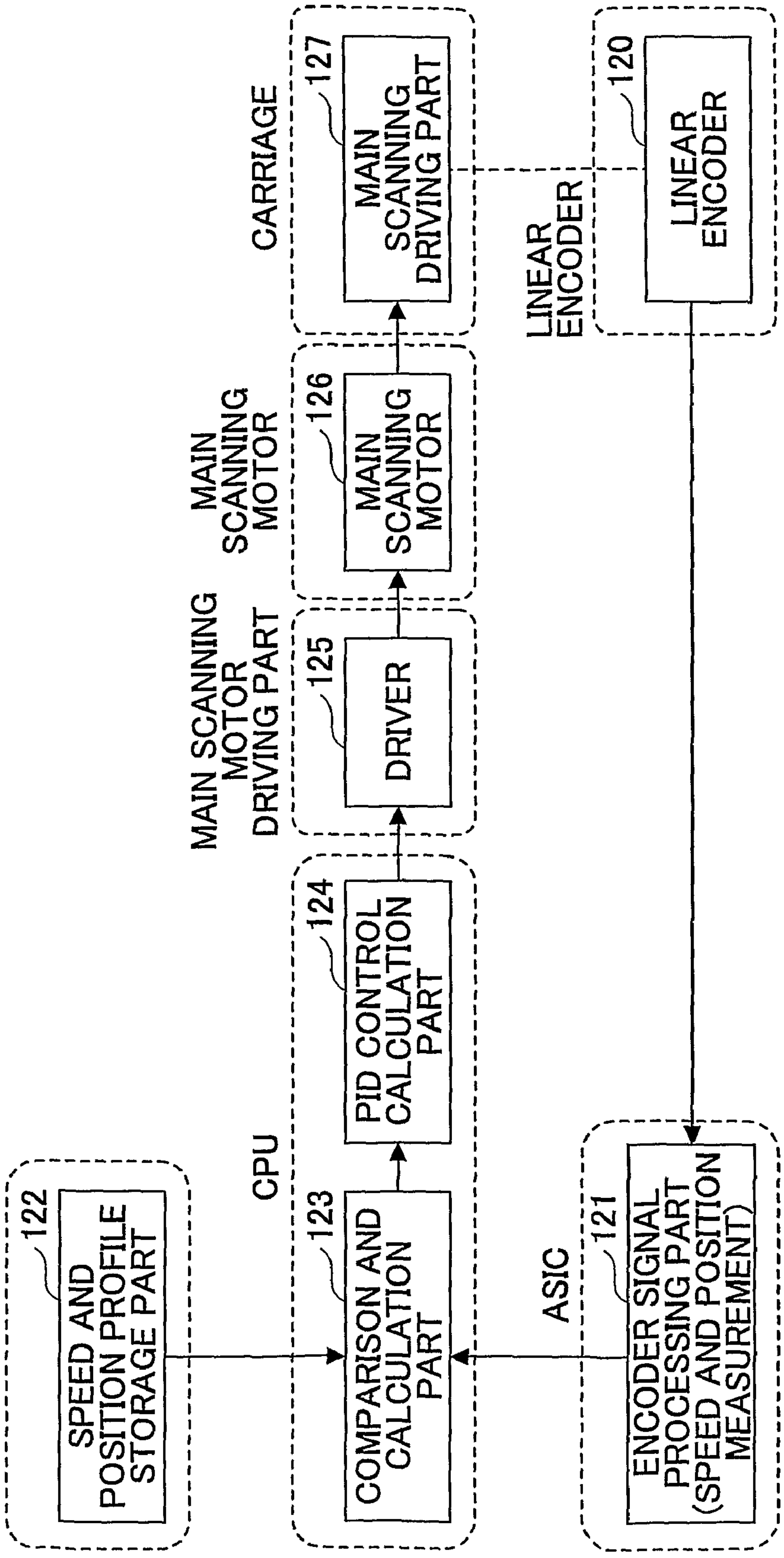
FIG. 4 shows a schematic flow diagram of a servo controlling part that drives a carriage of an image forming apparatus.

Referring next to FIG. 4, a description is made of driving control of the carriage 100.

FIG. 4 shows a schematic flow diagram of a servo controlling part that drives the carriage of the image forming apparatus.

First, an encoder signal from the linear encoder 120 is processed by an encoder signal processing part 121 to measure the values of the position and speed of the carriage. The measured values are compared with the values of a target position and speed stored in a speed and position profile storage part 122 by a comparison and calculation part 123. Based on this comparison result, a motor output value is calculated by a PID control calculation part 124. Then, the main scanning motor 126 is driven by a driver 125 to drive a main scanning driving part 127.

When ink droplets are ejected from the recording head to form images on the recording medium 108, the output to the main scanning motor 126 is controlled so that the speed of the carriage 100 in the main scanning direction can be kept as constant as possible.

Figure 5A:
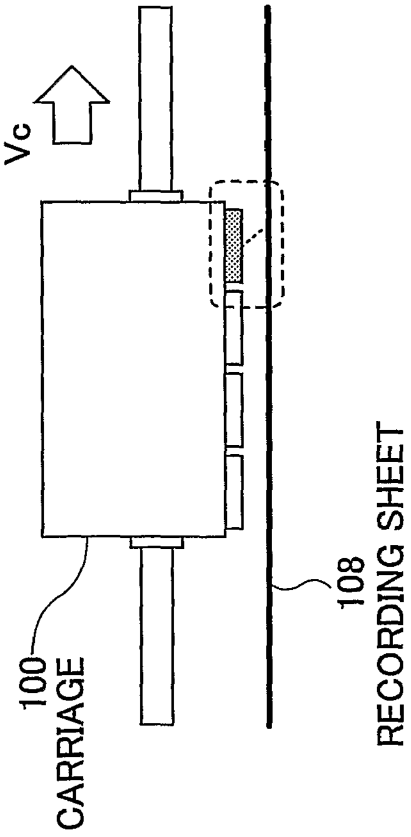
FIGS. 5A and 5B show explanatory views about a distance in a main scanning direction between a position where an ink droplet is ejected and a position where the ink droplet is shot onto a recording sheet.
Figure 5B:
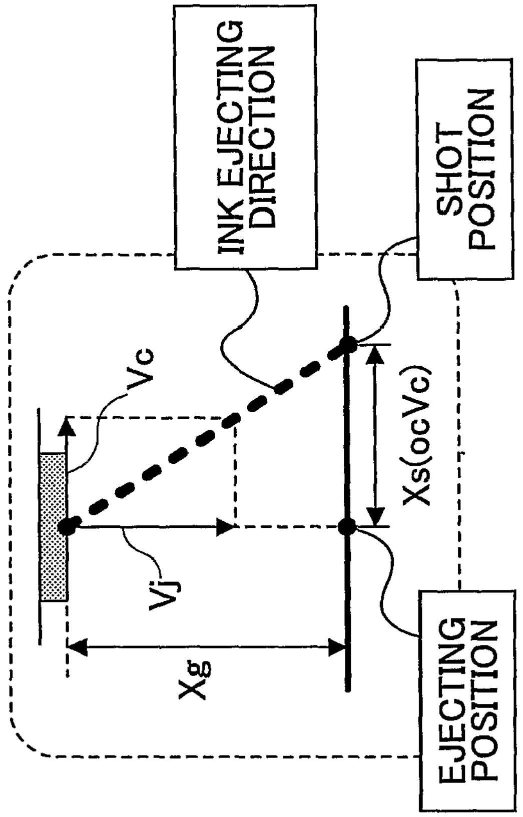

FIGS. 5A and 5B show explanatory views about a distance in the main scanning direction between a position where an ink droplet is ejected and a position where the ink droplet is shot onto a recording sheet.

Note that FIG. 5B shows the area encircled by dotted lines in FIG. 5A.

As shown in FIGS. 5A and 5B, assuming that the speed of the carriage 100 in the main scanning direction is represented as Vc, the ejection speed of an ink droplet is represented as Vj, and a distance between the recording head and the recording medium 108 is represented as Xg, the distance Xs in the main scanning direction between the position where an ink droplet is ejected and the position where the ink droplet is shot onto the recording medium 108 is expressed by the equation $Xs=Vc\times Xg/Vj$.

Here, because Xs is proportional to Vc, it appears that a fluctuation in the speed of the carriage 100 influences the quality of images.

Figure 6:
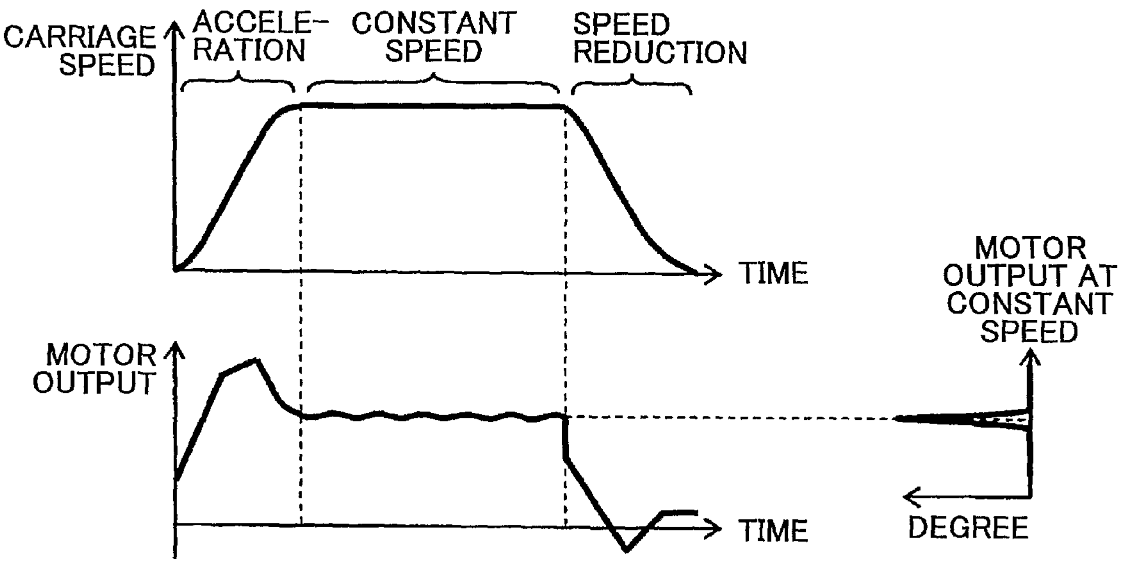
FIG. 6 shows a relationship between the moving speed and the motor output of the carriage at a normal operation (no jamming)

In order to verify the occurrence of the jamming, a description is made of a relationship between the moving speed and the motor output of the carriage at the scanning of the carriage referring to FIG. 6.

FIG. 6 shows the relationship between the moving speed and the motor output of the carriage at a normal operation (no jamming).

In forming images, the carriage 100 is first accelerated up to a predetermined target speed. When the carriage 100 reaches the target speed, it then moves at a constant speed. After this, the carriage 100 is decelerated and stopped.

Because the load does not greatly fluctuate with the position of the carriage 100 in the constant-speed moving area shown in FIG. 6, the output of the main scanning motor 126 is nearly constant.

Figure 7:
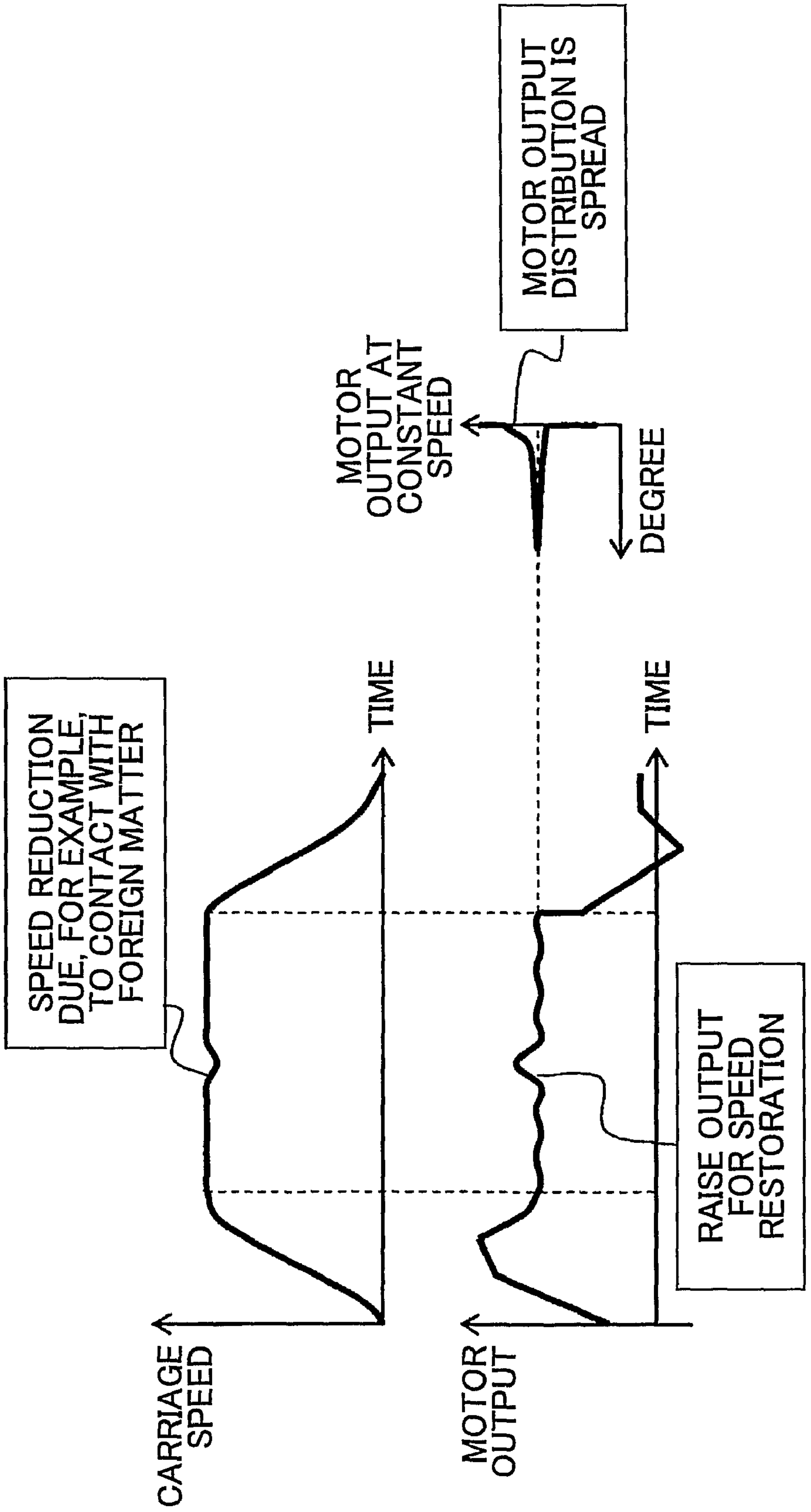
FIG. 7 shows the relationship between the moving speed and the motor output of the carriage when jamming is caused.

However, when the carriage 100 comes in contact with foreign matter or the like during its constant-speed movement to cause a conveyance failure, the speed of the carriage 100 is reduced due to the contact and the output of the main scanning motor 126 is raised as shown in FIG. 7.

Figure 8:
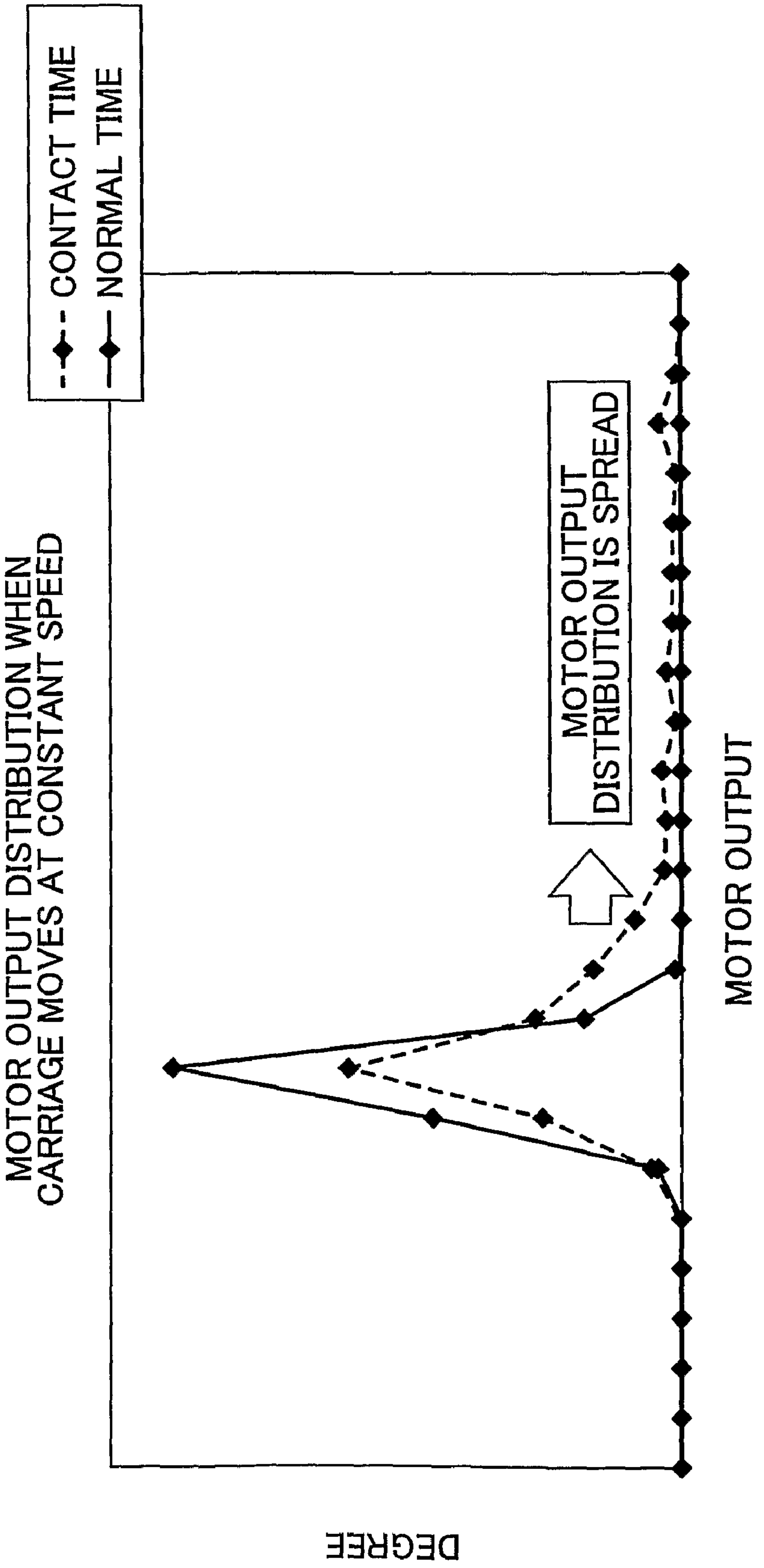
FIG. 8 shows a motor output distribution.

In other words, as represented by dotted lines in FIG. 8, when the carriage 100 is scanning while coming in contact with foreign matter, the motor output distribution in the entire scanning area is widely spread. Accordingly, by detecting the distribution degree of variation of the motor output, it possible to detect the occurrence of the jamming such as sheet clogging due to the contact with the foreign matter.

Note that the motor output shown in the horizontal axis in FIG. 8 is a control value that is input from the PID control calculation part 124 to the main scanning motor driving part 125 to control the main scanning motor 126, and it can be set as a duty ratio, a voltage value, a current value, etc., for PWM control.

Furthermore, the degree of variation in the vertical axis represents the output time of each motor output value in the horizontal axis per unit of scanning.

Figure 9:
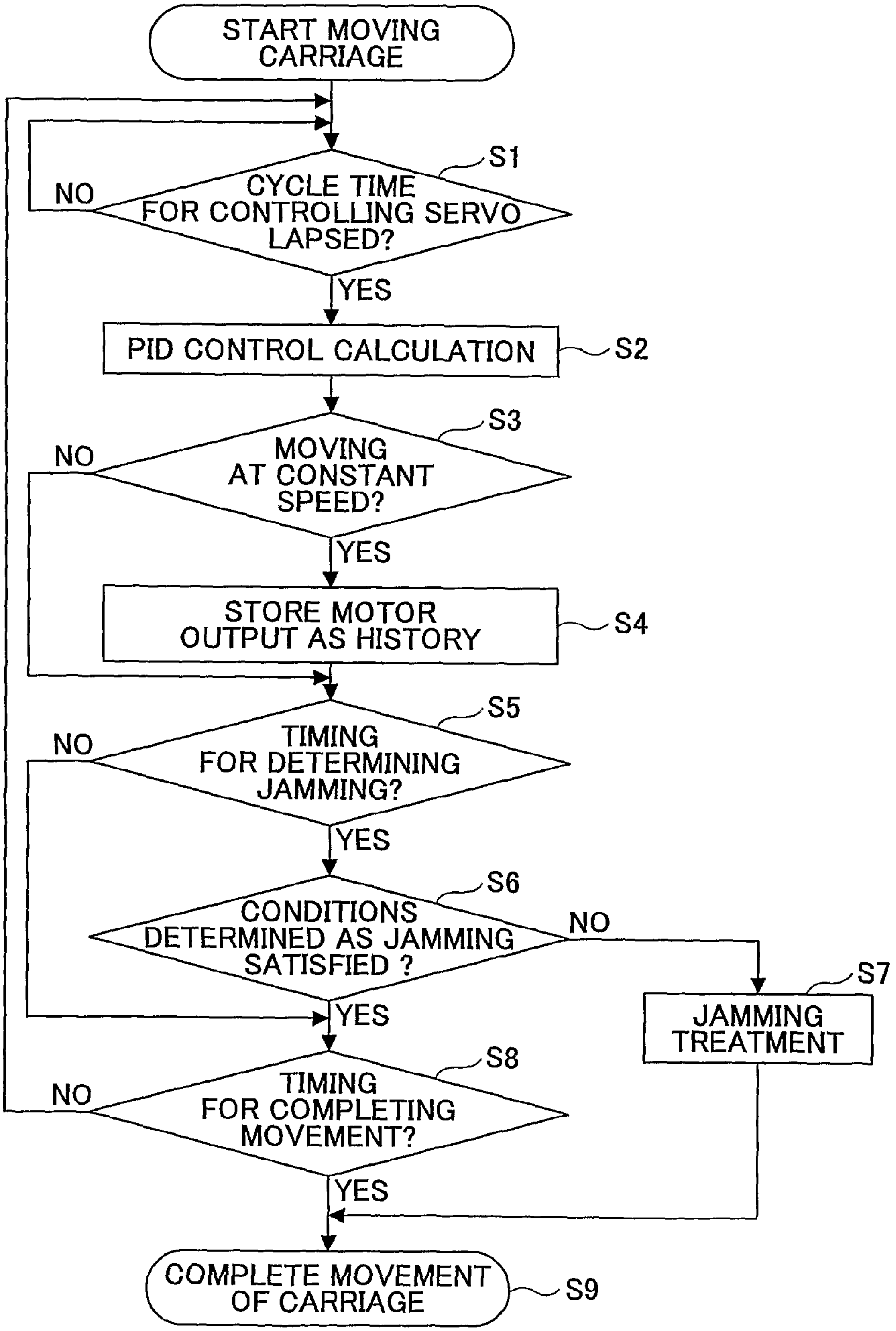
FIG. 9 shows an operations flow chart for detecting the jamming based on the degree of variation of the motor output distribution.

Referring here to FIG. 9, a description is made of a method of detecting the jamming occurring when the carriage is moved in the main scanning direction.

FIG. 9 shows an operations flow chart for detecting the jamming based on the degree of variation of the motor output distribution. Note that the operations flow from the movement start to the movement end of the carriage is shown in FIG. 9.

When the movement of the carriage 100 is started, calculation for controlling a servo is not performed until a cycle time for controlling the servo elapses after the previous calculation is performed (S1: No). When the cycle time for controlling the servo elapses (S1: Yes), PID control calculation is performed (S2).

After the value of the motor output is determined by the PID control calculation, it is confirmed whether the carriage is moving at a constant speed. If it is determined that the carriage is moving at a constant speed (S3: Yes), the value of the motor output is stored as history (S4) and then the process proceeds to the next step (S5). If it is determined that the carriage is not moving at a constant speed (S3: No), the process directly proceeds to the next step (S5).

In step (S5) in FIG. 9, if it is timing for determining the conveyance failure (jamming) (S5: Yes), a determination is made, from the history of the values of the motor outputs, as to whether conditions recognized as the jamming are satisfied (S6). If it is determined that the jamming is caused (S6: Yes), a predetermined treatment is performed in accordance with the status of the jamming (S7) and the movement of the carriage is completed (S9).

In step (S5), if it is not timing for determining the jamming (S5: No), or if the conditions recognized as the jamming are not satisfied (S6: No), a determination is made as to whether it is timing for completing the movement of the carriage (S8). If it is determined to be the timing for completing the movement (S8: Yes), the movement of the carriage is completed (S9). If it is not determined to be the timing therefor (S8: No), the process is returned to step S1 and waits for the lapse of the next cycle time for controlling the servo.

The timing for determining the jamming in step (S5) may be set for every cycle time for controlling the servo or set for every predetermined number of the cycle times. Also, it may be set only at the time when the movement of the carriage is completed.

Moreover, it is also possible to change the timing as needed. For example, the timing for determining the jamming may be set in greater number and shorter time than usual for a predetermined number of times after the jamming is detected.

Note that the shorter the interval between the timings for determining the jamming is set, the sooner foreign matter coming in contact with the carriage can be detected. However, in a case where the jamming is determined by software, large amounts of CPU resources are consumed accordingly. In order to address this, the above jamming detection method and other known ones are combined together to record data as a basis for determining the jamming in advance and the timing for determining the jamming is set at the time "when the movement of the carriage is completed." In this manner, the workload on the CPU 50 can be reduced.

Also, a determination may be made in accordance with the degree of the jamming. Specifically, the jamming causing a relatively greater fluctuation in the motor output may be immediately detected, and the jamming causing a relatively smaller fluctuation in the motor output may be detected when the movement of the carriage is completed.

Next, a description is made of a method of setting the conditions for determining the jamming in step (S6) in FIG. 9.

(First Method)

Figure 10:
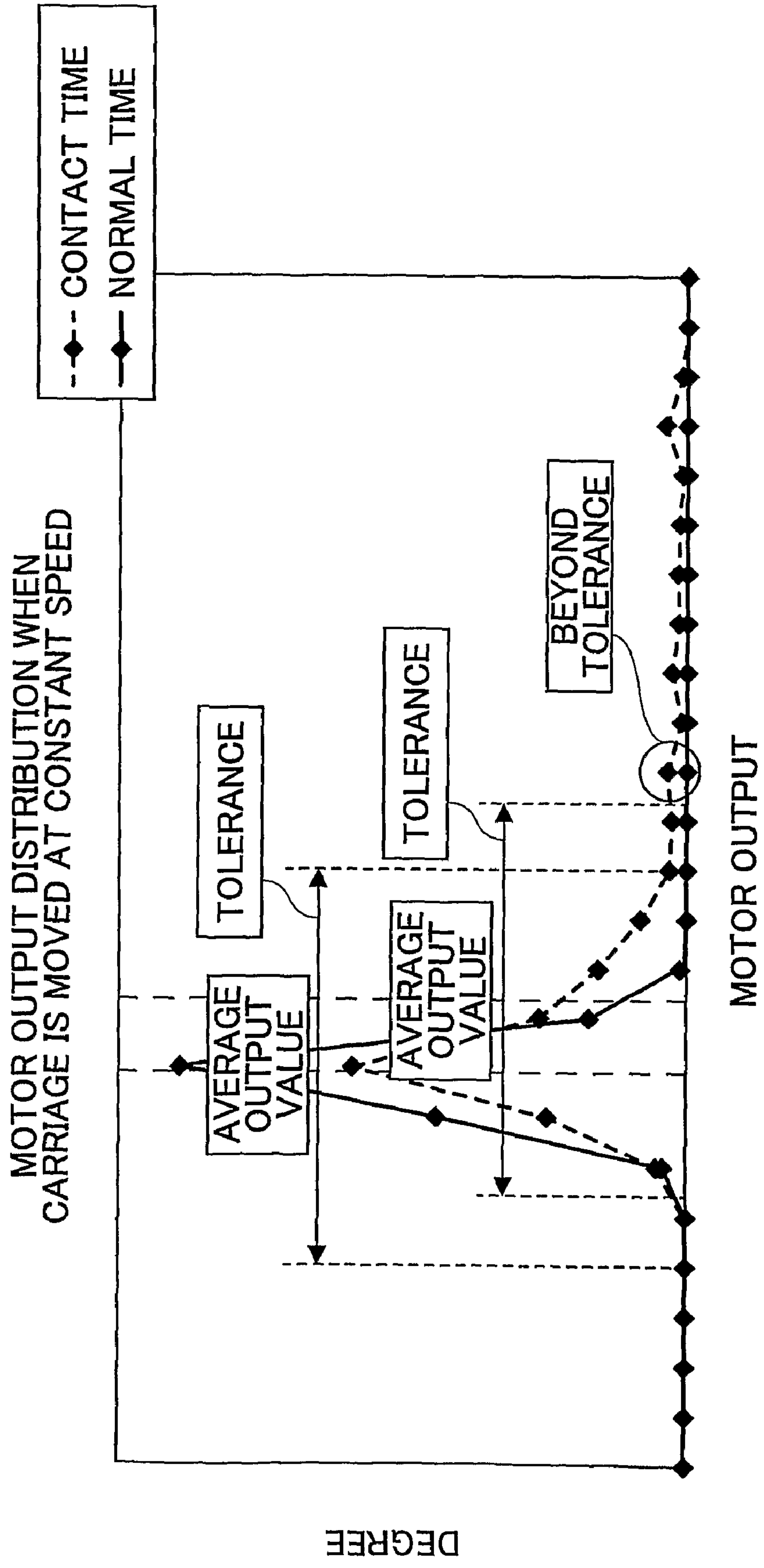
FIG. 10 shows an explanatory drawing about a method of determining the jamming by setting a predetermined tolerance width based on an average value of motor outputs.

The history of the values of the motor outputs of the carriage moving at a constant speed is previously recorded, and plural points in the history are selected to calculate an average output value. The calculated average output value is compared with a previously set reference output value. As shown in FIG. 10, tolerances having a predetermined width are set before and after the average output value. If there is an output value beyond the tolerances, it is determined that the jamming is caused. As shown by the dotted lines in FIG. 10, in a case where the carriage comes in contact with foreign matter, the value of the motor output beyond the tolerances is detected.

(Second Method)

Figure 11:
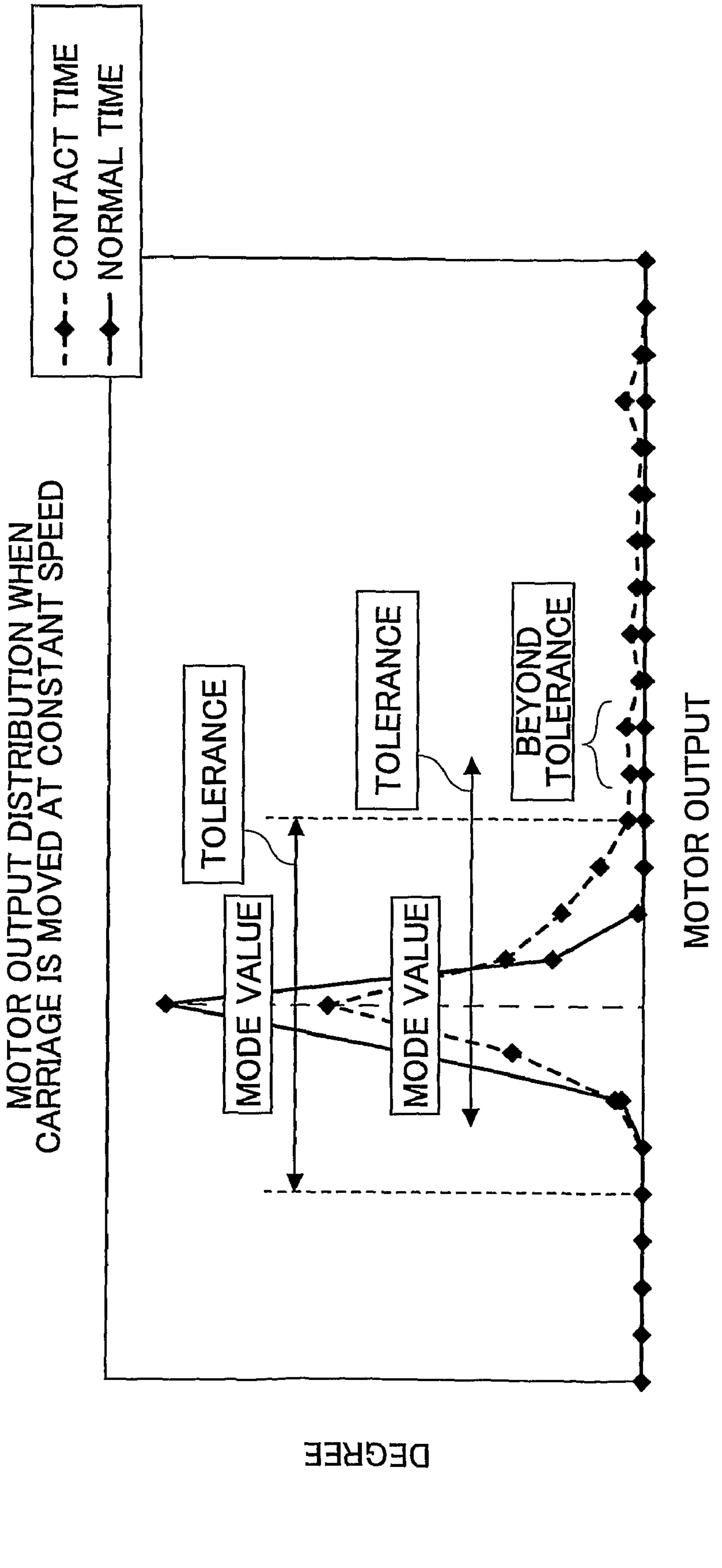
FIG. 11 shows an explanatory drawing about a method of determining the jamming by setting a predetermined tolerance width based on a most frequent value of motor outputs.

The history of the values of the motor outputs of the carriage moving at a constant speed is previously recorded, and a most frequent value between plural points in the history is selected. The selected most frequent value is compared with a previously set reference output value. As shown in FIG. 11, tolerances having a predetermined width are set before and after the reference output value. If there is an output value beyond the tolerances, it is determined that the jamming is caused. As shown by the dotted lines in FIG. 11, in a case where the carriage comes in contact with foreign matter, the values of the motor outputs beyond the tolerances are detected.

(Third Method)

Figure 12:
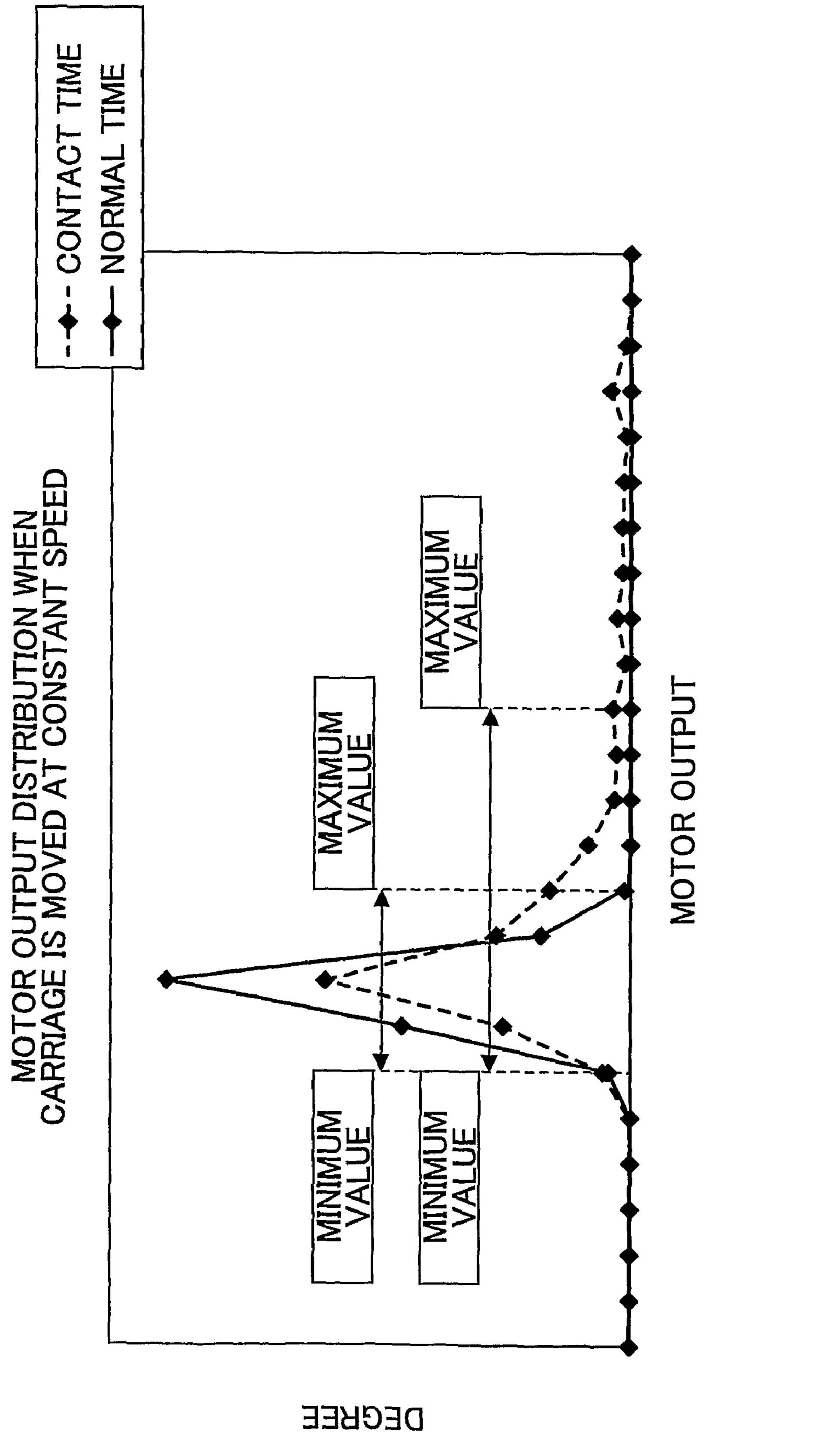
FIG. 12 shows a difference between the maximum and minimum values of motor outputs when the carriage comes in contact and does not come in contact with foreign matter.

The history of the values of the motor outputs of the carriage moving at a constant speed is previously recorded, and the maximum and minimum values between plural points in the history are selected. The difference between the maximum and minimum values is compared with a previously set reference tolerance. As shown by the dotted lines in FIG. 12, in a case where the carriage comes in contact with foreign matter, the difference between the maximum and minimum values of the motor outputs becomes large. If the difference goes beyond the predetermined tolerance, it is determined that the jamming is caused.

Setting the predetermined tolerance for determining the jamming as described above is to prevent a small amount of fluctuation in the motor outputs occurring at a normal operation from being erroneously detected as the jamming.

An expected tolerance including a margin of a fluctuation tolerance width may be set as the tolerance. However, the value of the motor output such as the motor output B shown in FIG. 13 may go beyond the fluctuation tolerance width even if the difference between the maximum and minimum values is the same.

Figure 13:
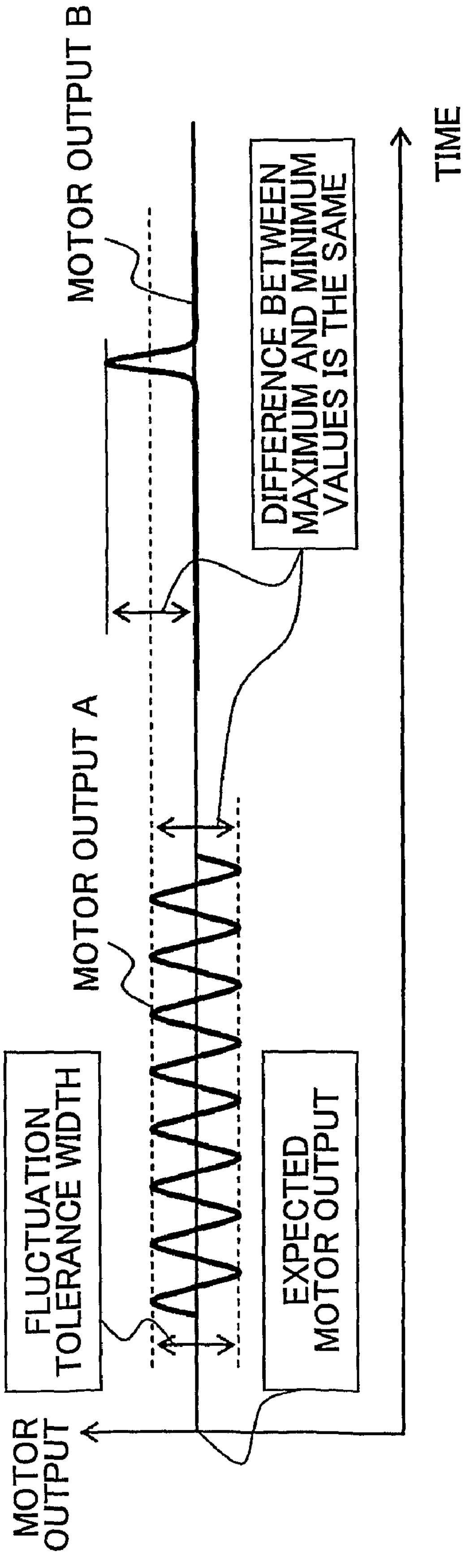
FIG. 13 shows a relationship between the difference between the maximum and minimum values of the motor outputs and a fluctuation tolerance width of the motor outputs.

FIG. 13 shows a case where the value of the motor output goes beyond the fluctuation tolerance width even if the difference between the maximum and minimum values of the outputs of the carriage motor moving at a constant speed is the same.

Accordingly, the method of determining the jamming using the average output value as a reference is advantageous in detecting the jamming even in the case of the motor output B in FIG. 13.

The second method is effective if it is assumed that the time in which the carriage comes in contact with foreign matter is shorter than the time in which the carriage normally moves without coming in contact with the foreign matter. In other words, it is expected that the motor output where the carriage does not come in contact with the foreign matter is the most frequent value.

Figure 14:
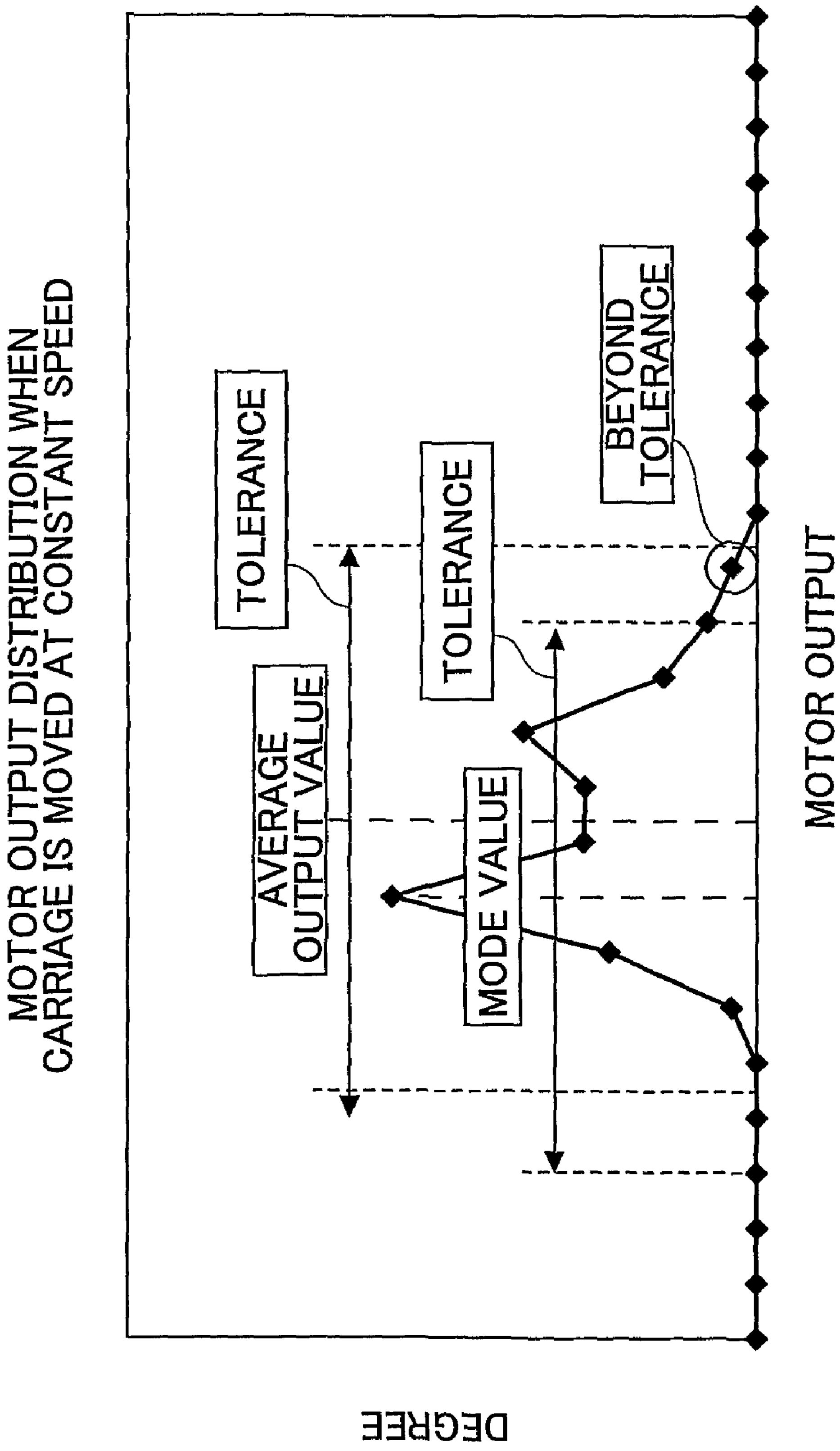
FIG. 14 shows an explanatory drawing for explaining the tolerance in a case where two peaks exist in the motor output distribution when the carriage moves at a constant speed.

For example, as shown in FIG. 14, two peaks may occur in a case where the motor output distribution is spread when the carriage moves at a constant speed. With the method of determining the jamming using the average output value as a reference as in the first method, the tolerance is likely to include the output distribution because the value as the determination reference is identified between the two peaks. However, with the method of determining the jamming based on the most frequent value of the motor output as in the second method, the end of the extremely spread output distribution can be excluded because the value of the motor output where the carriage does not come in contact with foreign matter is set as the reference. As a result, it is possible to improve accuracy of detecting the jamming.

Here, a description is made of the tolerance set in the conditions for determining the jamming in step (S6) in FIG. 9.

As described above, the value of the motor output when the carriage 100 moves at a constant speed is nearly constant, but a small amount of fluctuation actually occurs due to a load fluctuation depending on a position in the main scanning direction, the cogging of a motor, the decentering of a pulley, etc.

The tolerance is set in order to prevent such a fluctuation in the motor output from being erroneously detected as the jamming.

Accordingly, it is necessary to determine the tolerance width in consideration of the size of a fluctuation.

As a first method of determining the tolerance width, the standard deviation of the motor output distribution when the carriage moves at a constant speed without coming in contact with foreign matter may be used.

Specifically, it is preferable that the tolerance width be approximately three to six times the standard deviation.

The fluctuation in the motor output may be influenced by a load due to the position of the carriage. Furthermore, it may be influenced by external environmental factors such as temperature and humidity.

Particularly, a temperature change influences the viscosity of a lubricant in a sliding part.

Moreover, it may be influenced by time degradation of the apparatus such as a stain on the encoder scale and the abrasion of a mechanical part.

Accordingly, it is necessary to determine the tolerance width in consideration of the size of a fluctuation based on these influences.

In other words, the tolerance width may be determined based on the maximum value of the fluctuation due to the position, use environment, and time degradation of the carriage. Also, the tolerance width may be determined as needed in accordance with a table obtained by determining the size of the fluctuation in each condition, using as parameters the position, use environment (such as temperature) and use duration (total driving rotation number, total driving time, and the number of printed sheets in a printer since the use of the carriage is started).

In the following, table 1 shows an example for determining the tolerance width based on temperature and the number of printed sheets.

Figure 16:
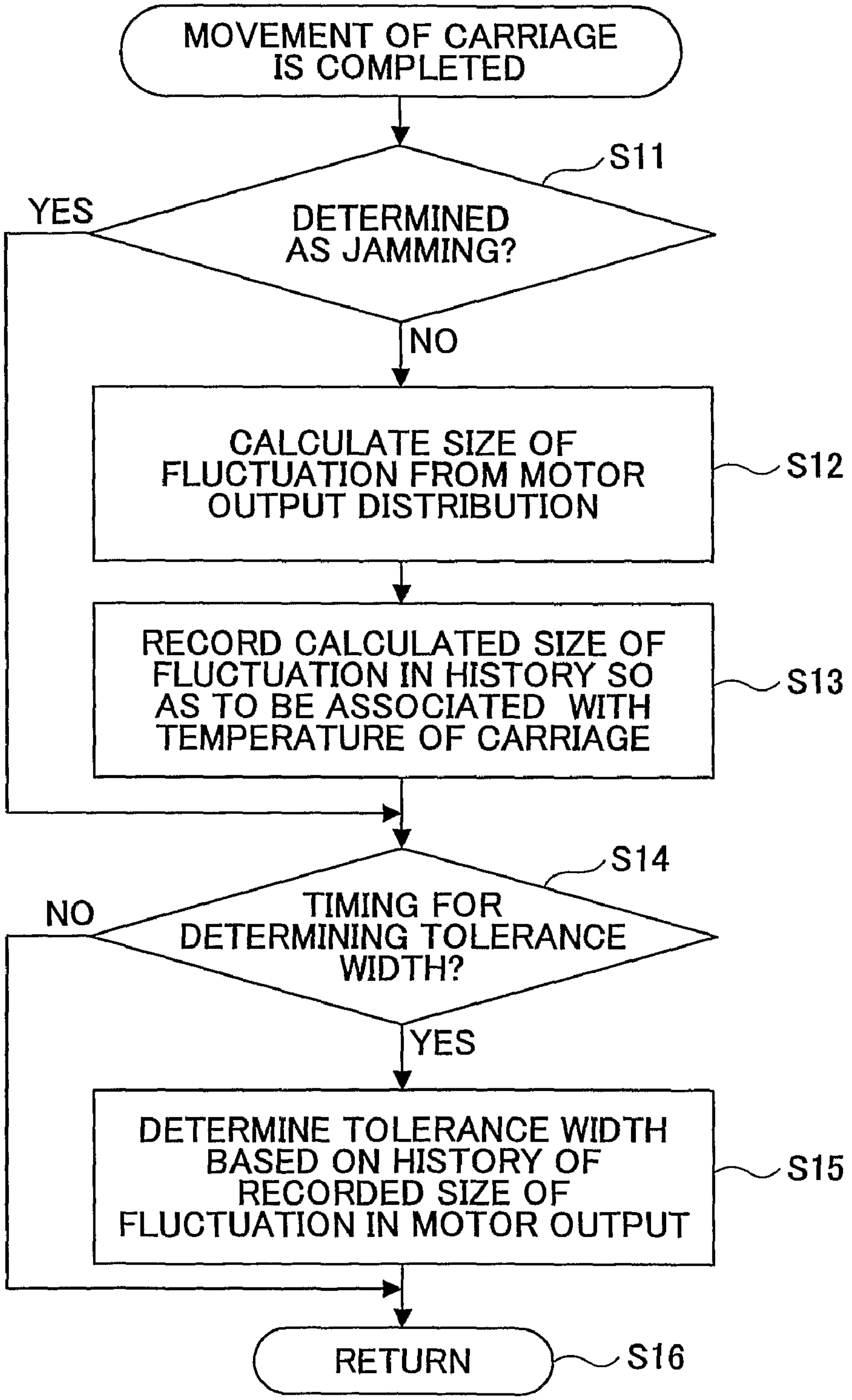
FIG. 16 shows a flowchart when the tolerance width for detecting the jamming is determined by causing the image forming apparatus to determine the size of a fluctuation for each parameter.

Note that the procedure of the flowchart in FIG. 16 is performed after the movement of the carriage 100 is completed.

First, it is determined whether the jamming is caused in the movement of the carriage (S11). If it is determined that the jamming is caused (S11: Yes), the process proceeds to step (S14). If it is determined that the jamming is not caused (S11: No), the size of a fluctuation is calculated from a motor output distribution (S12) and then the calculated size of the fluctuation is recorded in a history so as to be associated with the temperature of the carriage during its movement (S13).

In step (S14), a determination is made as to whether it is timing for determining a tolerance width. If it is not the timing for determining the tolerance width (S14: No), the flow is completed (S16). If it is the timing for determining the tolerance width (S14: Yes), the tolerance width is determined based on the history of the recorded size of the fluctuation in the motor output (S15) and then the flow is completed (S16).

Note that the timing for determining the tolerance width in step (S14) can be appropriately set. For example, it can be set at the time when the history of the fluctuation in the same temperature category reaches a predetermined number, or at the time when the carriage is moved for a predetermined number of times since the last update.

The method of causing the image forming apparatus to determine the size of the fluctuation for each parameter is particularly effective for a case if ambient environmentals such as temperature are changed in operation, provided that the number of movements of the carriage is large and total printing time is long like the multi-pass printing method.

The image forming apparatus according to the present invention may use the so-called 1-pass printing method in which images are formed by single main scanning or use the

| | | NUMBER OF PRINTED SHEETS | | | |
|---|---|---|---|---|---|
| | | 0 SHEET OR MORE AND LESS THAN 5000 SHEETS | 5000 SHEETS OR MORE AND LESS THAN 10000 SHEETS | 10000 SHEETS OR MORE AND LESS THAN 30000 SHEETS | 30000 SHEETS OR MORE |
| TEMPERATURE | 0° C. OR HIGHER AND LESS THAN 3° C. | 21% | 25% | 29% | 32% |
| | 3° C. OR HIGHER AND LESS THAN 10° C. | 16% | 19% | 22% | 26% |
| | 10° C. OR HIGHER AND LESS THAN 25° C. | 7% | 10% | 13% | 17% |
| | 25° C. OR HIGHER | 3% | 5% | 8 | 12% |

Figure 15:
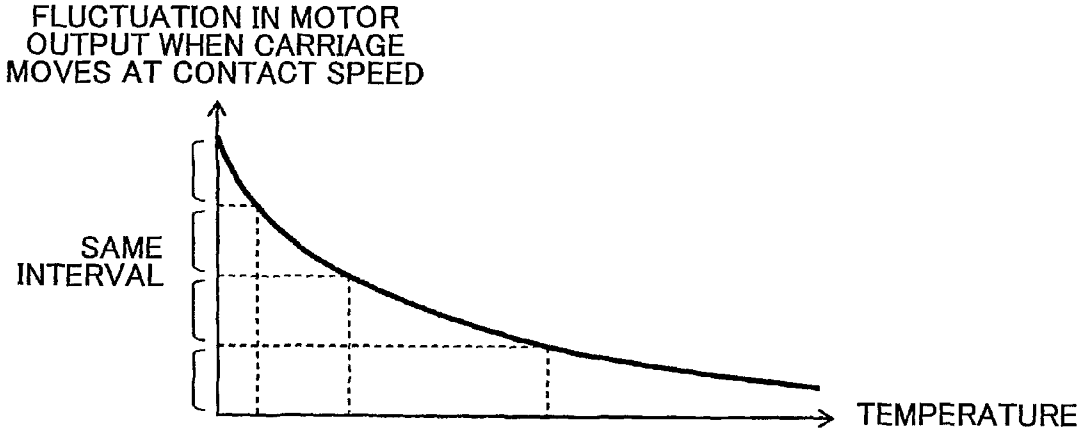
FIG. 15 shows an explanatory drawing about a method of dividing a temperature category when the motor output of the carriage at a constant speed fluctuates due to the external environment (temperature)

Note that an interval for dividing parameters (category) in this table is not limited to a constant interval. For example, when a relationship between temperature and a tolerance width is like one shown in FIG. 15, the category of the temperature may be determined so as to make the tolerance width constant.

Another method of determining the tolerance is to cause the image forming apparatus to determine the size of a fluctuation for each parameter in advance.

A description is now made of an example of this method referring to FIG. 16.

so-called multi-pass printing method in which images are formed by plural times of main scannings relative to the same area of a recording medium with the same nozzle group or different nozzle groups. Alternatively, these methods may be appropriately combined so as to be used in the image forming apparatus.

The multi-pass printing method is described below.

In the following, a description is made of a case in which images are completed by four times of main recording scanning (4-pass) relative to a recording area.

Figure 17:
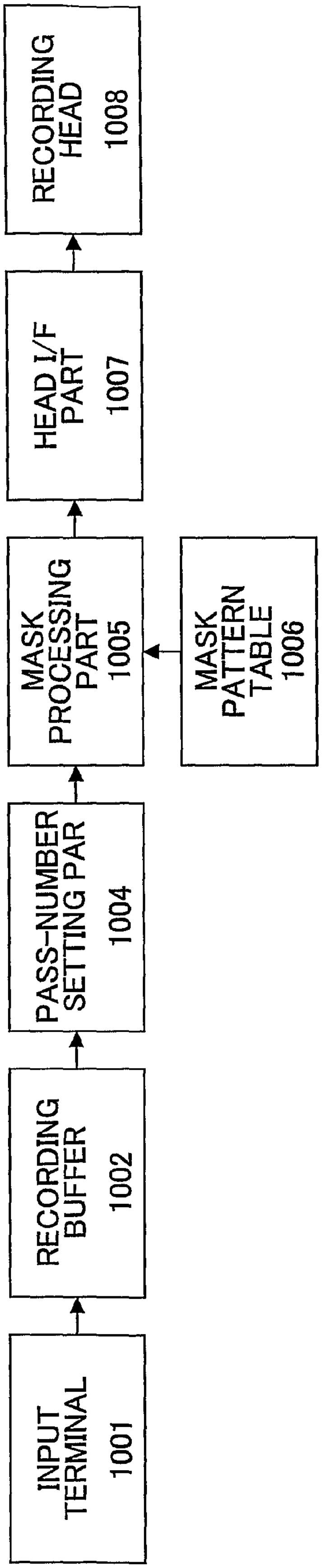
FIG. 17 is a block diagram schematically showing an image processing part.

FIG. 17 is a block diagram schematically showing an image processing part in this embodiment.

In FIG. 17, reference numeral 1001 denotes an input terminal, reference numeral 1002 denotes a recording buffer, reference numeral 1004 denotes a pass-number setting part, reference numeral 1005 denotes a mask processing part, reference numeral 1006 denotes a mask pattern table, reference numeral 1007 denotes a head I/F part, and reference numeral 1008 denotes a recording head.

The bit map data input from the input terminal 1001 are stored at a predetermined address of the recording buffer 1002 by a not shown recording buffer controlling part. The recording buffer 1002 has a capacity capable of storing bit map data in the amount corresponding to single scanning and a sheet feeding amount and constitutes a ring buffer in sheet feeding amount units like a FIFO memory. The recording buffer controlling part controls the recording buffer 1002. When the bit map data of single scanning are stored in the recording buffer 1002, the recording buffer controlling part starts a printer engine, reads the bit map data from the recording buffer 1002 in accordance with the position of each nozzle of the recording head, and inputs the read bit map data to the pass-number setting part 1004. Furthermore, when bit map data for the next scanning are input from the input terminal 1001, the recording buffer controlling part controls the recording buffer 1002 so that they are stored in a free space (area corresponding to a feeding amount of a sheet on which the recording of images has been completed) of the recording buffer 1002.

A specific configuration example of the pass-number setting part 1004 in the image processing part is described.

The pass-number setting part 1004 determines a division pass-number and outputs the determined division-pass number to the mask processing part 1005.

The mask pattern table 1006 selects a necessary mask pattern from a table of previously stored mask patterns, e.g., a mask pattern of 2-pass recording, 4-pass recording, and 8-pass recording in accordance with the determined division pass-number and outputs the selected mask pattern to the mask processing part 1005.

The mask processing part 1005 masks the bit map data stored in the recording buffer 1002 for each pass recording using the mask pattern and outputs the masked bit map data to a head driver 62. Then, the head driver 62 arranges the masked bit map data in the order used by the recording head 1008 and transfers them to the recording head 1008.

With the multi-pass printing method, it is possible to average white lines and density irregularities noticeable in the 1-pass printing so as to be inconspicuous.

Note that the image forming apparatus (ink jet recording apparatus) according to the present invention has a function of forming images on a recoding medium. Alternatively, the image forming apparatus may be combined with an inputting apparatus that transmits predetermined image information to constitute an image forming system.

The image forming apparatus according to the present invention operates in accordance with a control program that causes a predetermined driving signal to be transmitted.

In other words, the image forming apparatus operates in accordance with a conveyance failure detection program having an instruction system that causes an output detection unit to detect the motor outputs of the carriage at any plural points when the carriage moves at a constant speed and causes a jamming detection unit to compare an average value, a most frequent value, and a difference between the maximum and minimum values of the motor outputs of the carriage between the plural points with a predetermined tolerance to determine a conveyance failure.

The conveyance failure detection program may be previously installed in the image forming apparatus, or an information recording medium having the program recorded thereon may be read and executed.

Next, a description is specifically made of the configuration of a conveyance part for a recording medium (recording sheet) in the image forming apparatus according to the present invention and the image forming system.

The conveyance part is of a type that can use a conveyance belt. The conveyance belt may be endless, or it may be formed in such a manner that its both ends are bonded to each other.

In order to ensure the recording sheet is closely attached to the conveyance belt, static electricity may be applied to the conveyance belt so that the recording sheet is attracted, or the recording sheet may be pressed with a predetermined pressure roller from above.

Figure 18:
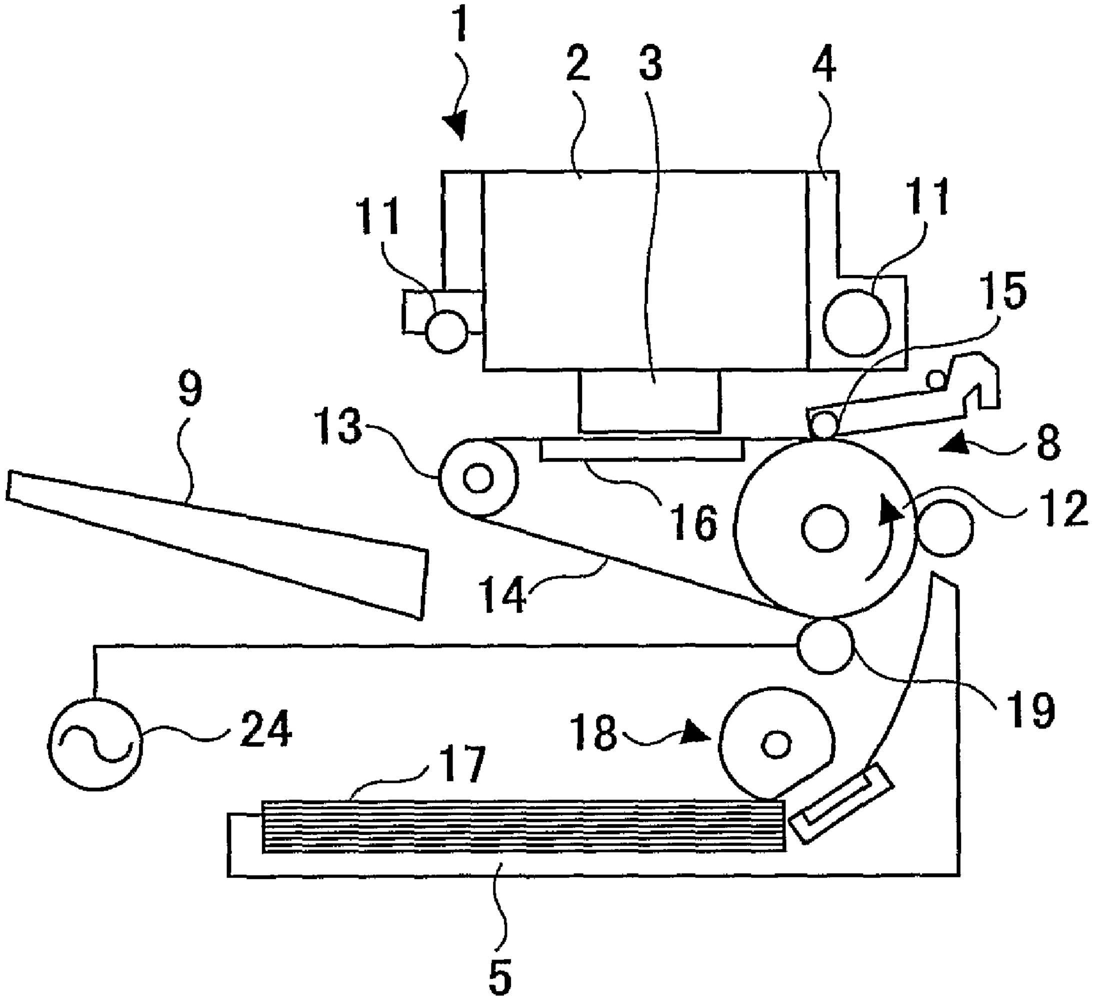
FIG. 18 shows a schematic configuration view of a recording medium conveyance part of an electrostatic attraction type.

FIG. 18 shows a schematic configuration view of a recording medium conveyance part of an electrostatic attraction type ink jet printer 1.

The conveyance part has a conveyance belt 14 that is wound around a driving roller 12 and a driven roller 13 and can be rotated; a pressure roller 15 that is pressed against the conveyance belt 14 at the position of the driving roller 12 with the elastic force of an elastic member such as a spring so as to prevent a slip between the driving roller 12 and the conveyance belt 14; a conveyance guide 16 that is provided beneath the recording head 3 between the driving roller 12 and the driven roller 13; and a belt charging roller 19 that is provided opposite to the driving roller 12 and comes in contact with the conveyance belt 14 at a position on the upstream side relative to the rotational direction of the driving roller 12 from the position where the recording sheet 17 stacked on the sheet feeding tray 5 is separated by a separation part 18 and fed to come in contact with the conveyance belt 14 at a part wound around the driving roller 12.

Note that the driving roller 12 is connected to a grounding wire.

Figure 19A:
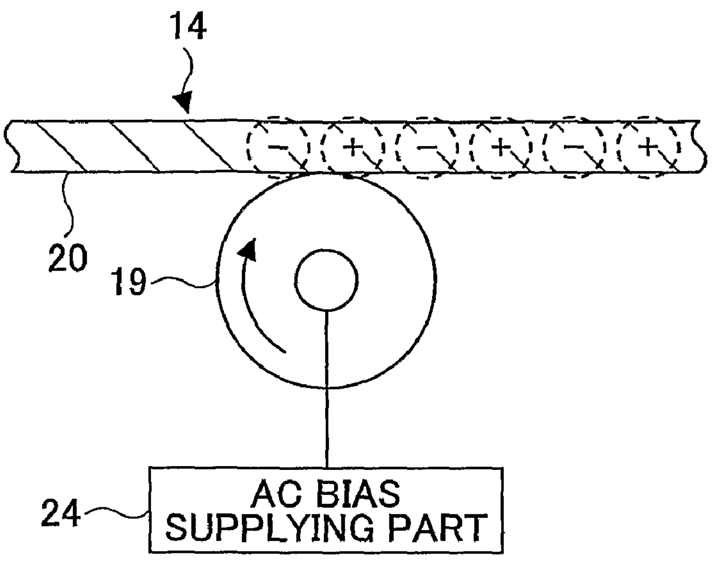
FIGS. 19A and 19B show schematic configuration views of a conveyance belt.
Figure 19B:
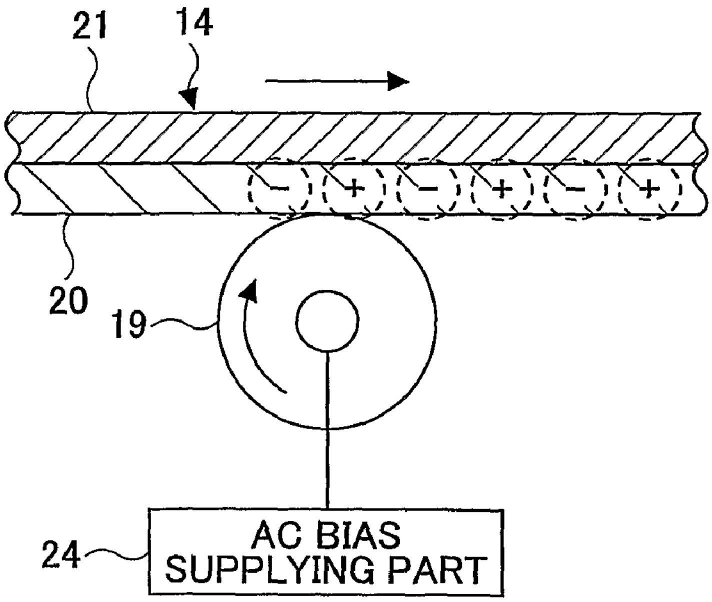

The conveyance belt 14 may have a single-layer structure as shown in a cross-sectional view in FIG. 19A or have a two-layer structure as shown in a cross-sectional view in FIG. 19B.

In the case of the single-layer structure, the side of the conveyance belt 14 with which the recording sheet 17 and the belt charging roller 19 come in contact is made of an insulation layer 20. In the case of the two-layer structure, the side of the conveyance belt 14 with which the recording sheet 17 and the belt charging roller 19 do not come in contact is made of a conductive layer 21.

The insulation layer 20 is made of a material that is a resin or an elastomer of PET, PEI, PVDF, PC, ETFE, or PTFE and does not contain a conductive control material so as to have a volume resistivity of $10^{12}$ Ω·cm or greater, preferably, $10^{15}$ Ω·cm or greater.

The conductive layer 21 is formed in such a manner that carbon is contained in the resin or elastomer to have a volume resistivity of $10^5$ through $10^7$ Ω·cm.

Figure 20B:
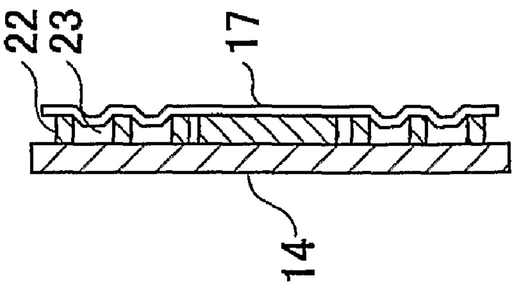
FIGS. 20A and 20B show a plan view and a side cross-sectional view, respectively, of the conveyance belt.
Figure 20A:
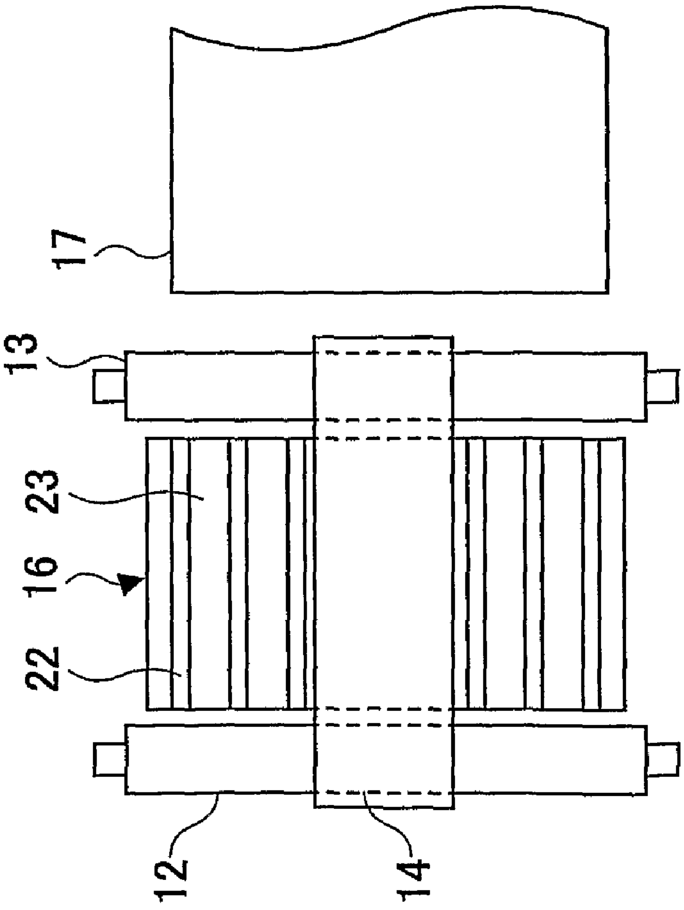

As shown in a plan view in FIG. 20A and a side cross-sectional view in FIG. 20B, the width of the conveyance belt 14 is narrower than that of a recording sheet 17 and wound in the vicinity of the center of the driving roller 12 and the driven roller 13.

The conveyance guide 16 is provided on both sides in the width direction of the conveyance belt 14 and has plural ribs 22 and clearance grooves 23 alternately provided oriented along the conveyance direction of the recording sheet 17.

As shown in FIGS. 19A and 19B, the belt charging roller 19 is connected to an AC bias supplying part 24 that applies an AC bias, for example, of 2 kV through 3 kV.

When instructions for outputting images are issued to the serial ink jet printer a having the above configuration, the driving roller 12 of a recording sheet conveyance apparatus 8 is rotated by a driving motor (not shown) to rotate the conveyance belt 14 counterclockwise and at the same time an AC bias is applied to the belt charging roller 19 from the AC bias supplying part 24.

As shown in FIGS. 19A and 19B, with the AC bias applied to the belt charging roller 19, positive and negative electric charges are alternately accumulated on the insulation layer 20 of the conveyance belt 14 relative to its moving direction.

Because the insulation layer 20 of the conveyance belt 14 on which the positive and negative electric charges are accumulated is formed to have a volume resistivity of $10^{12}$ Ω·cm or greater, preferably, $10^{15}$ Ωcm or greater, the positive and negative charges accumulated on the insulation layer 20 can be prevented from moving between their boundaries and be alternately stably accumulated on the insulation layer 20.

Figure 21A:
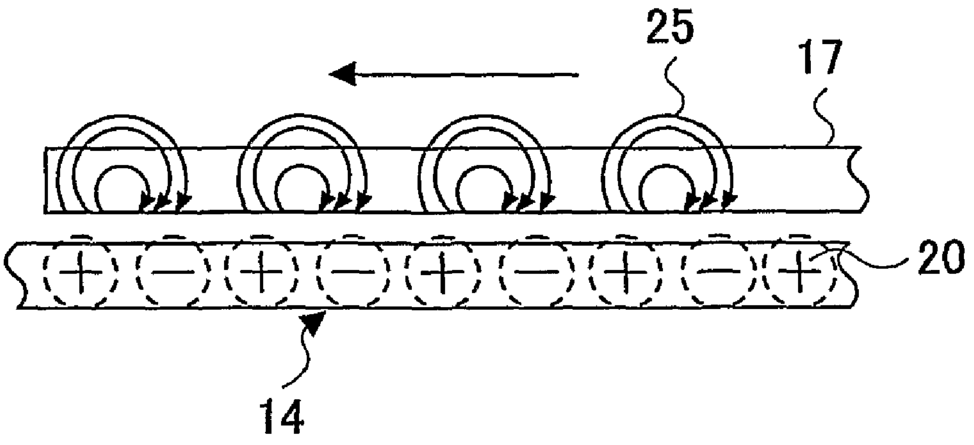
FIGS. 21A and 21B show a charged state on the conveyance belt.
Figure 21B:
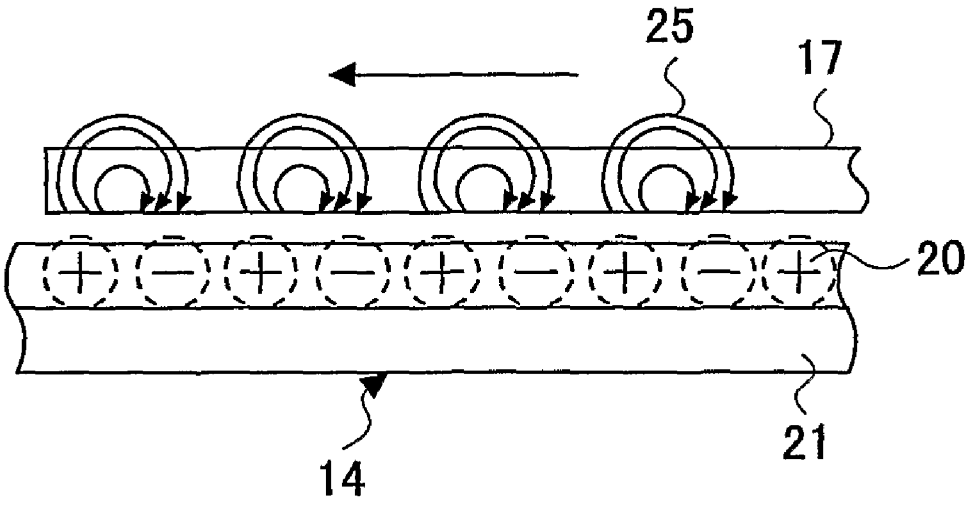

As shown in FIGS. 21A and 21B, when the recording sheet 17 separated and fed by the separation part 18 comes in contact with the conveyance belt 14, an electrostatic force acts on the recording sheet 17 by minute electric fields 25 guided from the positive charges to the negative charges and then the center of the recording sheet 17 is attracted onto the conveyance belt 14 by the electrostatic force.

In order to attract the recording sheet 17 onto the conveyance belt 14, the belt charging roller 19 that applies the positive and negative electric charges onto the conveyance belt 14 is provided in the vicinity of the position where the fed recording sheet 17 comes in contact with the conveyance belt 14 and at the position on the upstream side relative to the rotational direction of the driving roller 12 and the positive and negative electric charges are applied onto the conveyance belt 14 by the belt charging roller 19. Therefore, the minute electric fields 25 can be reliably generated at the position where the recording sheet 17 comes in contact with the conveyance belt 14, and the recording sheet 17 can be stably attracted onto the conveyance belt 14.

The recording sheet 17 attracted onto the conveyance belt 14 is conveyed to a printing part 7 by the rotation of the conveyance belt 14 while being pressed with the pressure roller 15.

When the tip end part of an image forming area on the recording sheet 17 reaches immediately below the recording head 3, the rotation of the driving roller 12 is stopped and the movement of the conveyance belt 14 is stopped. With the recording sheet 17 being stopped, the recording head 3 is reciprocated by the carriage in the main scanning direction to eject ink droplets so as to form images on the recording sheet 17.

When the image formation at the tip end part of the image forming area on the recording sheet 17 is completed, the driving roller 12 is driven again to rotate the conveyance belt 14. When the recording sheet 17 is conveyed and the next image forming area arrives immediately below the recording head 3, the rotation of the driving roller 12 is stopped and the movement of the conveyance belt 14 is stopped. Then, the image formation on the recording sheet 17 is repeatedly performed.

The conveyance and stoppage of the recording sheet 17 by the conveyance belt 14 are repeatedly performed to form an image on the recording sheet 17.

As described above, when the conveyance and stoppage of the recording sheet 17 are repeatedly performed to form an image on the recording sheet 17, the recording sheet 17 is attracted onto and fixed to the conveyance belt 14 by the electrostatic force of the minute electric fields 25 and the recording sheet 17 electrostatically attracted onto the conveyance belt 14 is uniformly pressed against the conveyance belt 14 with the pressure roller 15 so as to be closely attached to the conveyance belt 14. Accordingly, the recording sheet 17 can be stably conveyed to the position of the recording head 3.

Furthermore, the conveyance belt 14 is uniformly pressed against the driving roller 12 to increase a frictional force between the conveyance roller 12 and the conveyance belt 14 so as to prevent slippage between the driving roller 12 and the conveyance belt 14. Accordingly, the recording sheet 17 can be accurately conveyed and stopped.

Moreover, as shown in FIGS. 21A and 21B, the recording sheet 17 is attracted onto the conveyance belt 14 by the electrostatic force due to the minute electric fields 25 intermittently generated by the positive and negative electric charges alternately accumulated on the conveyance belt 14 at a constant, e.g., a 4 mm pitch. Therefore, the influence of the electrostatic force on the ink liquid droplets ejected from the recording head 3 can be eliminated, and the ink droplets can be ejected to a predetermined shooting (landing) position. Accordingly, high-quality images without a positional shift can be stably formed on the recording sheet 17.

When ink droplets are ejected from the recording head 3 to form images on the recording sheet 17, the ejected ink droplets permeate the recording sheet 17. Then, the recording sheet 17 expands to cause cockling to occur.

As shown in FIG. 20B, the expanded recording sheet 17 maintains its planarity at the ribs 22 of the conveyance guide 16 while falling in the clearance grooves 23 at areas other than the ribs 22, thereby preventing the floating of the entire recording sheet 17 due to the permeation of the ink liquid droplets.

Accordingly, a shift in shooting position of ink liquid droplets relative to the recording sheet 17 due to the cockling is prevented. Also, a stain on the nozzle surface of the recording head 3 or the recording sheet 17 due to contact between the recording sheet 17 and the nozzle surface of the recording head 3 is prevented. As a result, high-quality images can be stably formed.

The recording sheet 17 on which an image is formed in the above manner is conveyed to the downstream side of the recording head 3 with the movement of the conveyance belt 14.

When the moving direction of the conveyance belt 14 is changed by the driven roller 13, the recording sheet 17 is separated from the conveyance belt 14 due to its rigidity and guided to a discharging part 9.

As described above, the recording sheet 17 is attracted onto the conveyance belt 14 by the electrostatic force due to the minute electric fields 25 intermittently generated by the positive and negative electric charges alternately accumulated on the conveyance belt 14 at a constant pitch. Therefore, the recording sheet 17 can be easily separated from the conveyance belt 14 without a complicated recording sheet separation mechanism.

Furthermore, because the intermittently generated minute electric fields 25 are just applied to the discharged recording sheet 17, residual static electricity on the discharged recording sheet 17 can be prevented.

Moreover, in a case where the conveyance belt 14 has the two-layer structure of the insulation layer 20 and the conductive layer 21, the positive and negative electric charges accumulated on the insulation layer 20 are discharged to some extent during the movement of the conveyance belt 14 from the position of the recording head 3 to that of the driven roller 13. Therefore, the recording sheet 17 can be separated from the conveyance belt 14 more easily.

The above description refers to a case where an AC bias is applied to the belt charging roller 19 even when the recording head 3 is reciprocated by the carriage in the scanning direction and then ink droplets are ejected to form images on the recording sheet 17. Without being limited to this example, however, the AC bias applied to the belt charging roller 19 may be stopped when the conveyance belt 14 is stopped.

In this manner, by stopping the AC bias being applied to the belt charging roller 19 when the conveyance belt 14 is stopped, it is possible to eliminate with the AC bias the electric charges applied at a part with which the belt charging roller 19 of the conveyance belt 14 comes in contact and prevent electric charges from being applied in an undesired direction. As a result, the recording sheet 17 can be stably attracted when the conveyance belt 14 is successively rotated.

Furthermore, if electric charges are continuously applied to a part of the conveyance belt 14 even though the amount of current passing when the conveyance belt 14 is charged is very small, heat is generated in the conveyance belt 14 to induce pin holes, which may cause leakage. However, according to the above method, the occurrence of leakage in and damage to the conveyance belt 14 can be prevented.

Furthermore, the above description refers to a case where the pressure roller 15 is made of an insulation material and an AC bias is applied to the belt charging roller 19 when instructions for outputting an image are issued to the ink jet printer 1 and then the recording sheet 17 is fed. Without being limited to this example, however, an AC bias may be previously applied to the charging roller 19 while the conveyance belt 14 is continuously rotated so that positive and negative charges are applied to the conveyance belt 14. That is, when the instructions for outputting an image are issued to the ink jet printer 1, the recording sheet 17 may be fed after the AC bias applied to the belt charging roller 19 is stopped where the positive and negative electric charges are applied to the entire conveyance belt 14.

In this manner, by applying positive and negative charges to the conveyance belt 14 while the conveyance belt 14 is continuously rotated, the positive and negative charges can be stably applied to the conveyance belt 14.

Figure 32:
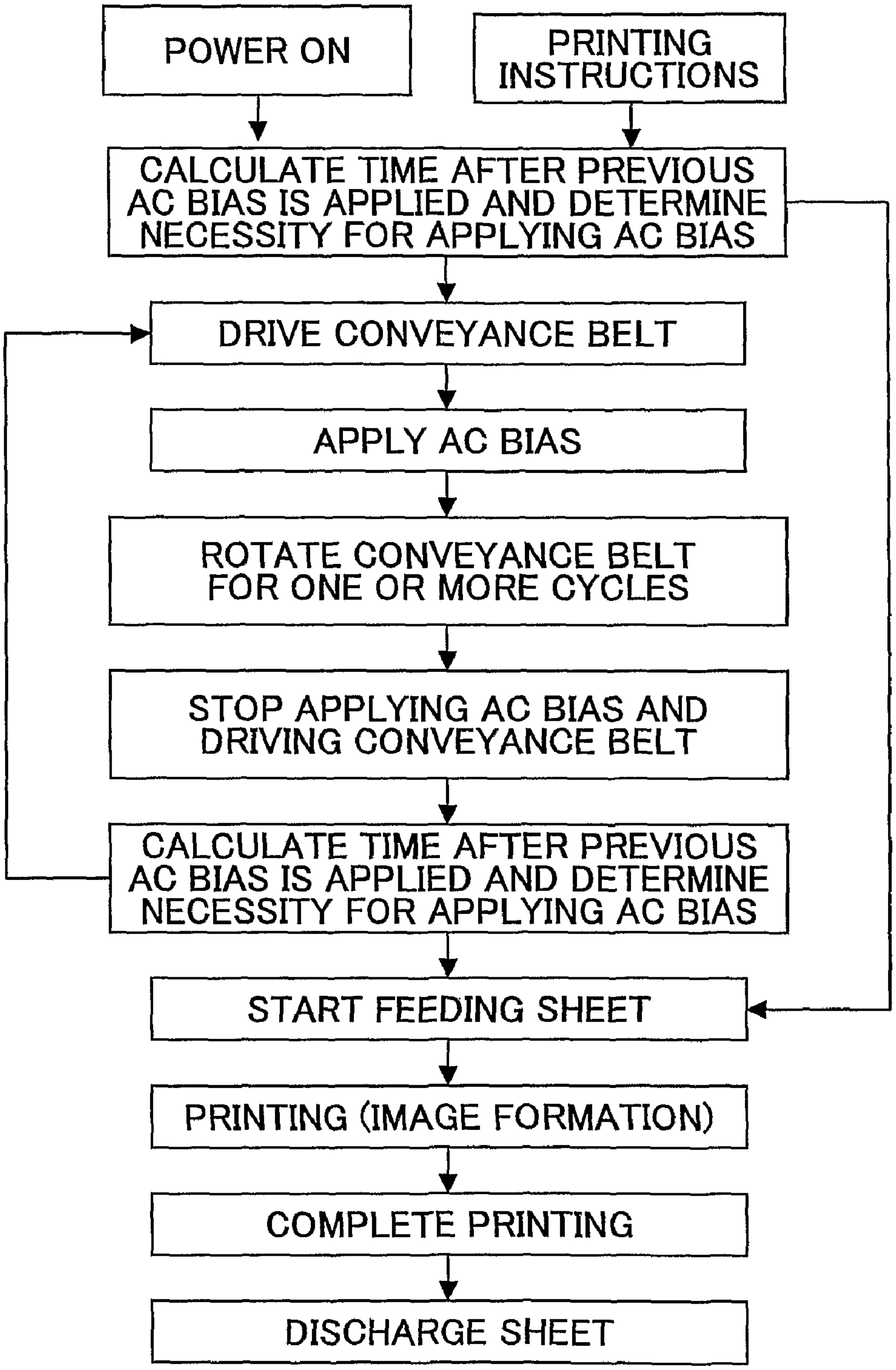
FIG. 32 shows an operating sequence in a case where a recording sheet is fed after an AC bias is applied to a charging roller.
Figure 33:
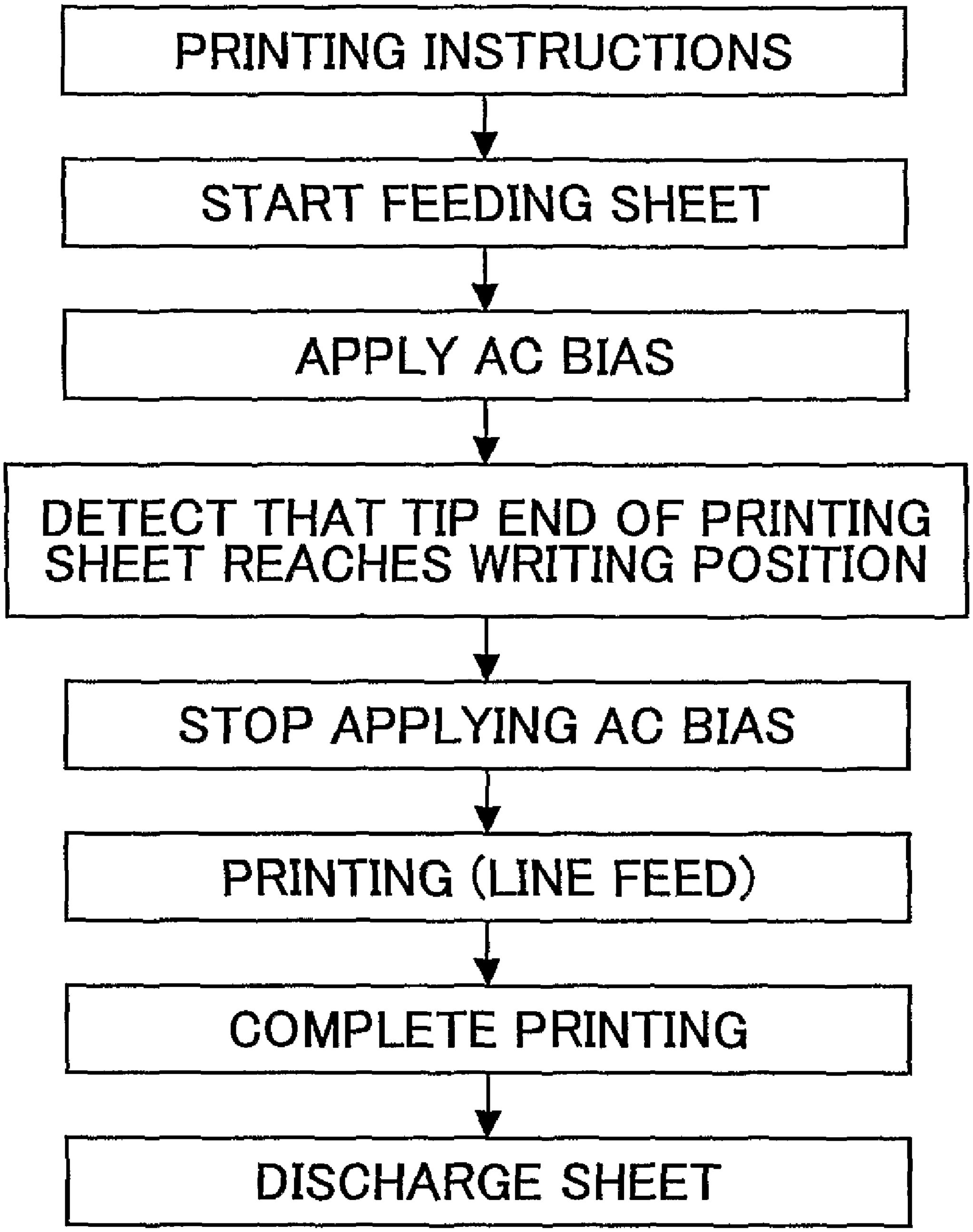
FIG. 33 shows an operating sequence when an AC bias is applied to the charging roller immediately before the recording sheet is fed.
Figure 34:
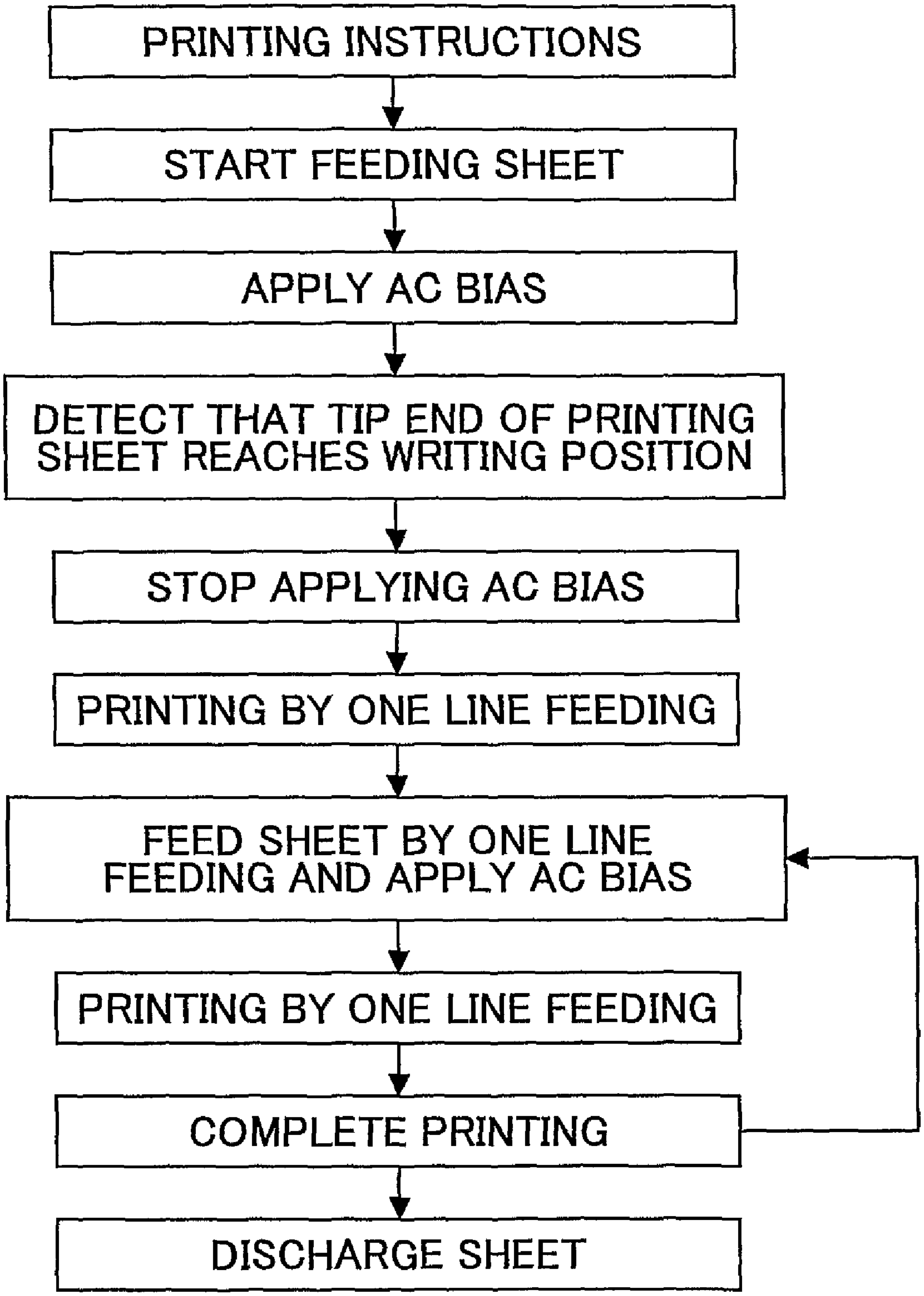
FIG. 34 shows an operating sequence in a case where the application of an AC bias to the charging roller is stopped when the feeding of the recording sheet is stopped.

Furthermore, the recording sheet 17 can be fed after an AC bias is applied to the belt charging roller 19 while the conveyance belt 14 is continuously rotated. Also, an AC bias is applied to the belt charging roller 19 so that the conveyance belt 14 can be charged immediately before the recording sheet 17 is fed. Moreover, the application of an AC bias to the belt charging roller 19 can be stopped when the feeding of the recording sheet 17 is stopped. An operating sequence for each case is shown in FIGS. 32 through 34.

In forming images, an amount of driving the conveyance belt for line feeding (line feeding amount) may not be an integral multiple of a charging pitch or may be an integral multiple thereof.

Figure 35:
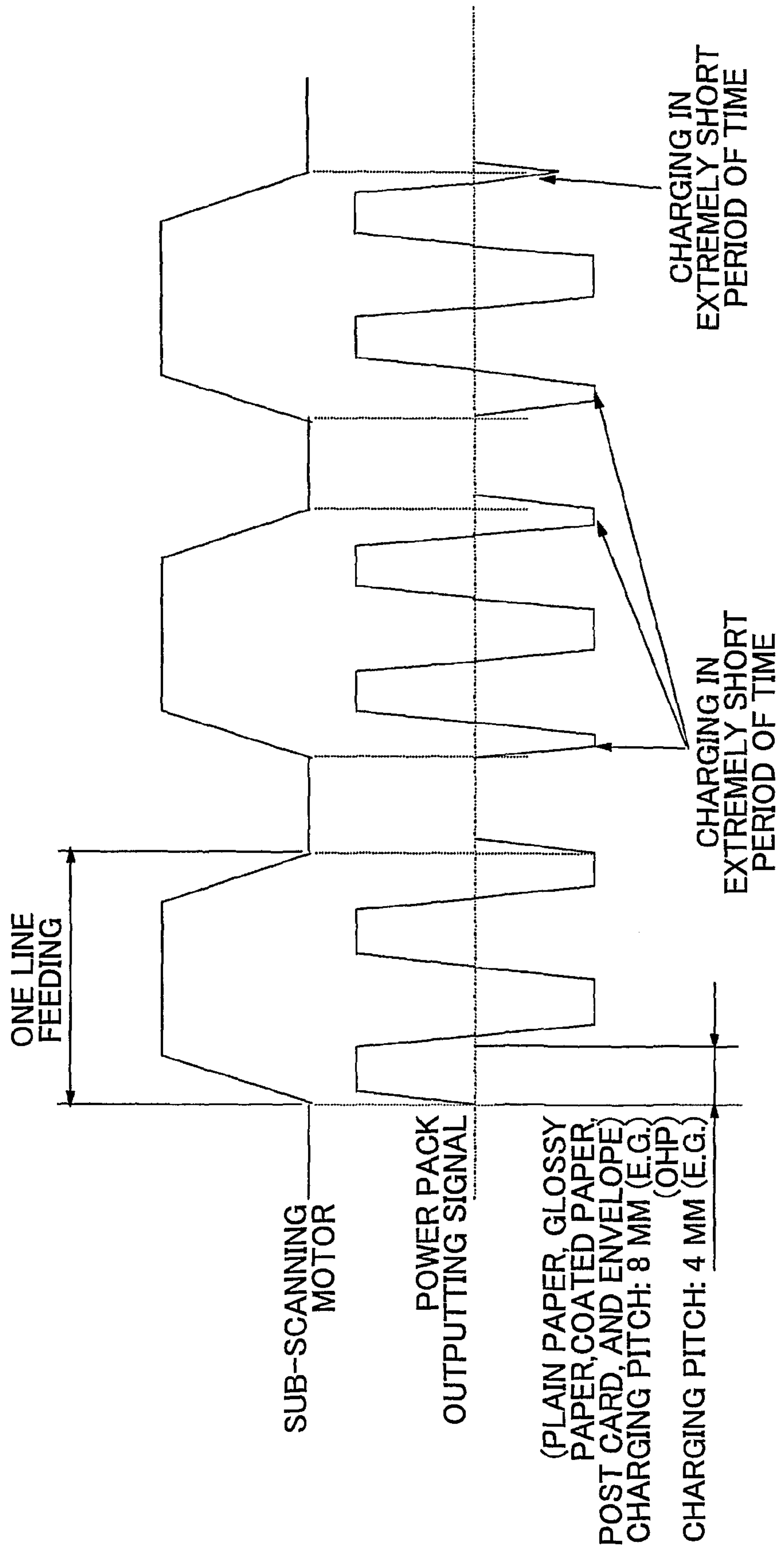
FIG. 35 shows a relationship between a driving amount (line feeding amount) of the conveyance belt and a charging pitch.

As shown in FIG. 35, if the amount of driving the conveyance belt for line feeding (line feeding amount) so as to form images is not an integral multiple of a charging pitch, or if the charging pitch is shorter than the amount of feeding one line, the positive and negative sides of high voltage outputs are interchanged during the driving of the conveyance belt. Where the line feeding is completed on the way without applying charges by a desired charging pitch during the feeding of one line, the remaining charges are applied in the next line feeding.

In this manner, even if the line feeding is stopped during the formation of a charging pitch having a constant width, a desired charging pitch is formed.

By forming a charging pitch in a reliable manner, it possible to stably provide an attraction force for a sheet.

Figure 36:
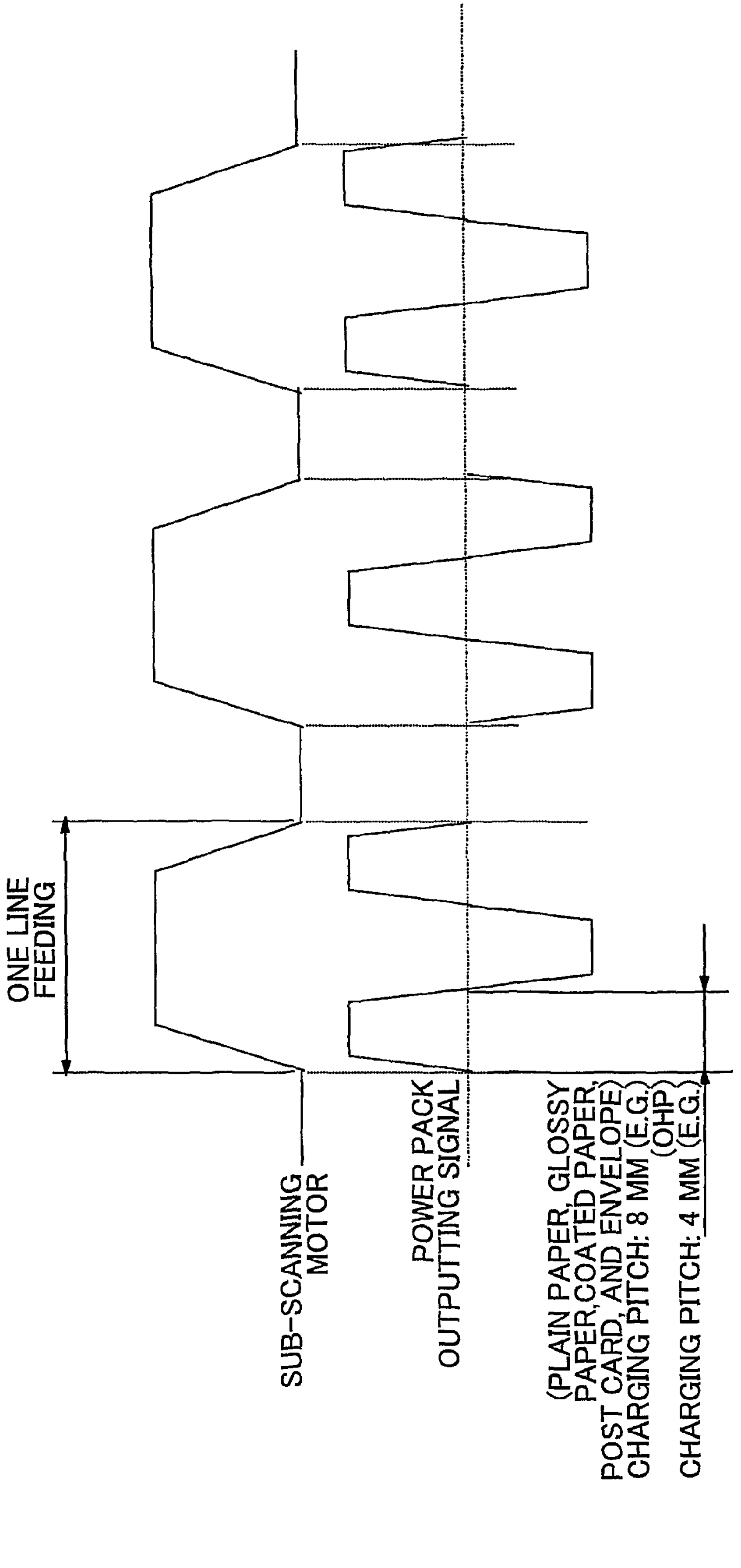
FIG. 36 shows the relationship between the driving amount (line feeding amount) of the conveyance belt and the charging pitch.

On the other hand, FIG. 36 shows a case where a charging pitch is set so that the amount of driving the conveyance belt for the line feeding (line feeding amount) in forming images becomes an integral multiple of the charging pitch, which is more preferable than a case where it does not become an integral multiple.

The line feeding amount is determined according to the pixel density of images to be formed, the nozzle pitch of a head, and the number of times using a nozzle.

Generally, an IJ-type serial image forming apparatus is capable of selecting plural pixel densities. A charging pitch is made 1/n (n=integer) times as many as the greatest common divider relative to all the line feeding amounts included in the image forming apparatus, whereby the formation of the charging pitch is necessarily completed during the feeding of one line as shown in FIG. 36. In this manner, it is not necessary to perform charging in an extremely short period of time as shown in FIG. 35. In performing charging in an extremely short period of time, a desired charging potential is not formed on the conveyance belt via the belt charging roller even if the output of a high voltage power rises to a desired potential. In other words, it is possible to prevent only a potential below a desired level from being applied, thereby attaining a reliable potential level.

As described above, when the recording sheet 17 is attracted onto the conveyance belt 14 of the serial ink jet printer 1 and conveyed to the position of the recording head 3 and then the conveyance and stoppage of the conveyance belt 14 are repeatedly performed in an intermittent manner, it is necessary to accurately control the stop position of the conveyance belt 14.

Therefore, the feeding speed or the feeding amount of the conveyance belt 14 may be directly or indirectly detected to thereby control the conveyance amount of the conveyance belt 14.

Figure 22A:
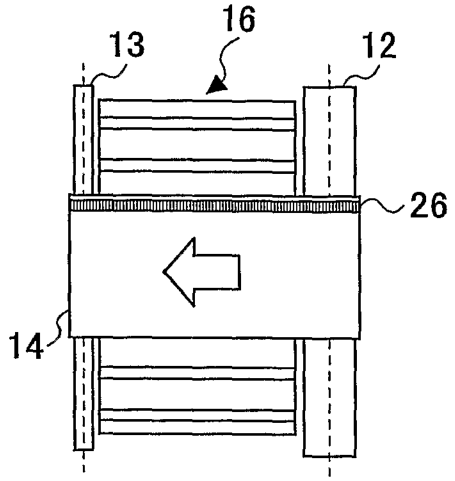
FIGS. 22A and 22B show a schematic front view of the conveyance belt and a schematic enlarged view showing a substantial part of the conveyance belt, respectively.
Figure 22B:
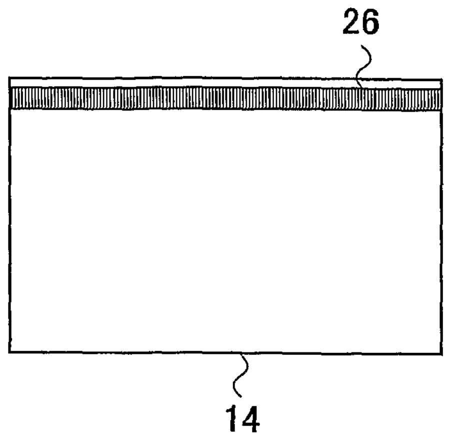
Figure 23A:
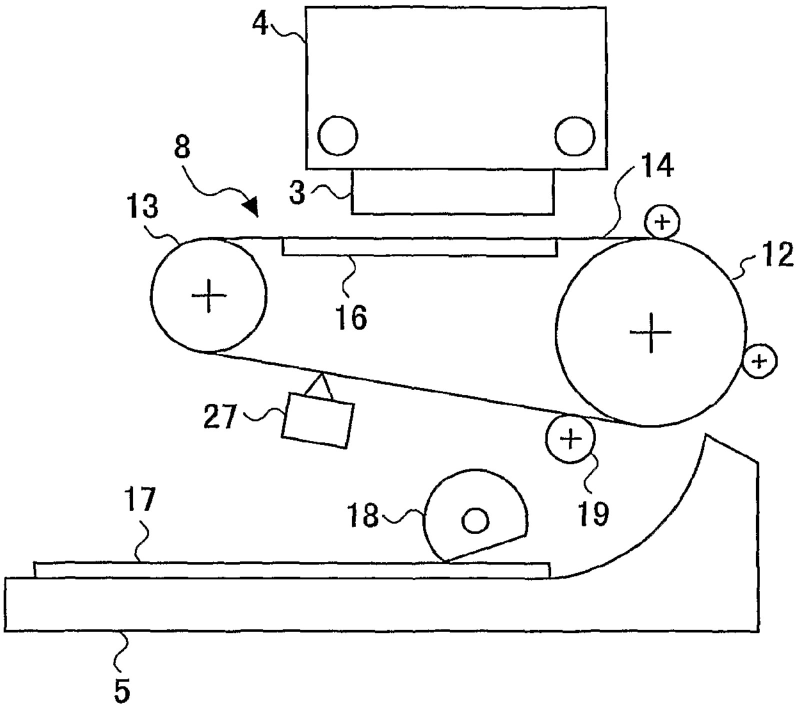
FIGS. 23A and 23B show examples of installing a reading sensor.
Figure 23B:
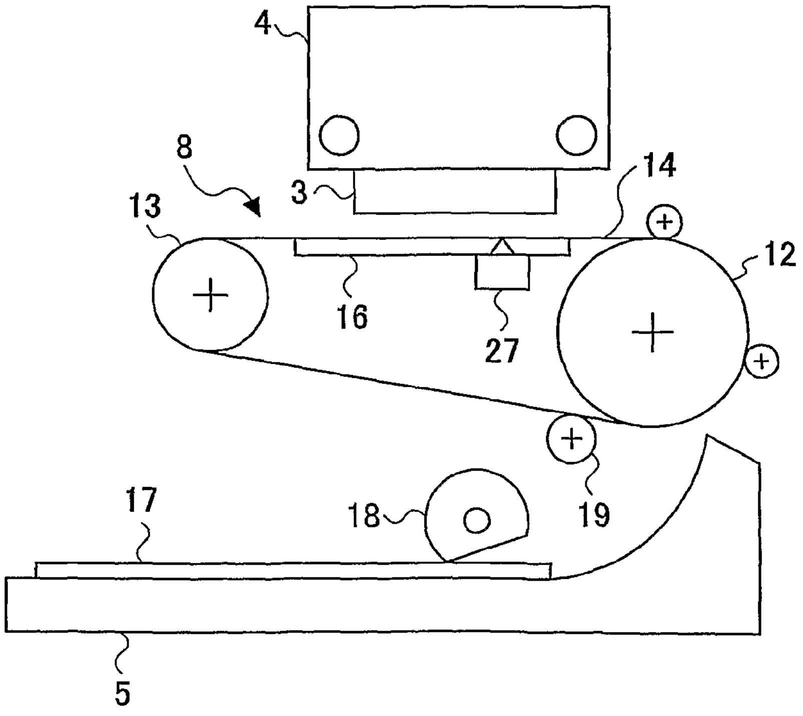

For example, in order to directly detect the feeding speed or the feeding amount of the conveyance belt 14, a binary scale 26, a reading sensor 27, or an encoder 28 may be used. The binary scale 26 is provided at a part of either the front or rear surface of the conveyance belt 14 at a pitch corresponding to the maximum resolution of the ink jet printer 1 as shown in a front view of the conveyance belt 14 in FIG. 22A and an enlarged view in FIG. 22B. The reading sensor 27 is of a transmissive or reflective type and provided at a position which does not affect the conveyance of the recording sheet 17 of the conveyance belt 14 as shown in FIG. 23A. The encoder 28 has the transmissive reading sensor 27 provided in the vicinity of the printing part 7 as shown in FIG. 23B.

Figure 30:
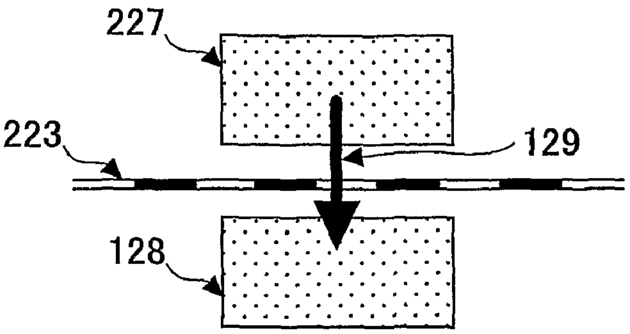
FIG. 30 shows a schematic view of a transmissive reading sensor.
Figure 31:
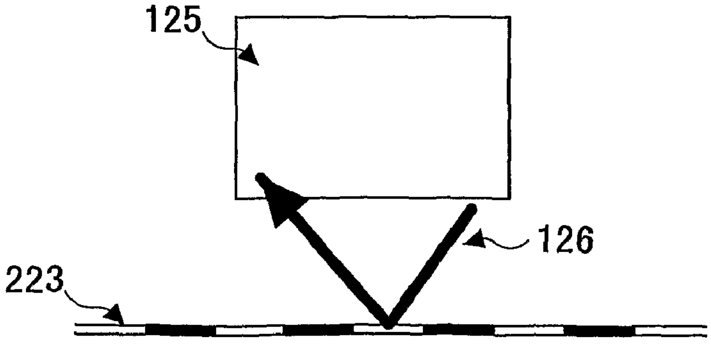
FIG. 31 shows a schematic view of a reflective reading sensor.

Note that a schematic view of the transmissive reading sensor and that of the reflective reading sensor are shown in FIGS. 30 and 31, respectively.

In FIG. 30, detection light 129 is transmitted from a detection light transmitting unit 227 to an encoder 223, and reflection light is detected by a light receiving unit 128.

In FIG. 31, detection light 126 is transmitted from a detection light transmitting and light receiving unit 125 to the encoder 223, and reflection light is detected by the detection light transmitting and light receiving unit 125.

Figure 24:
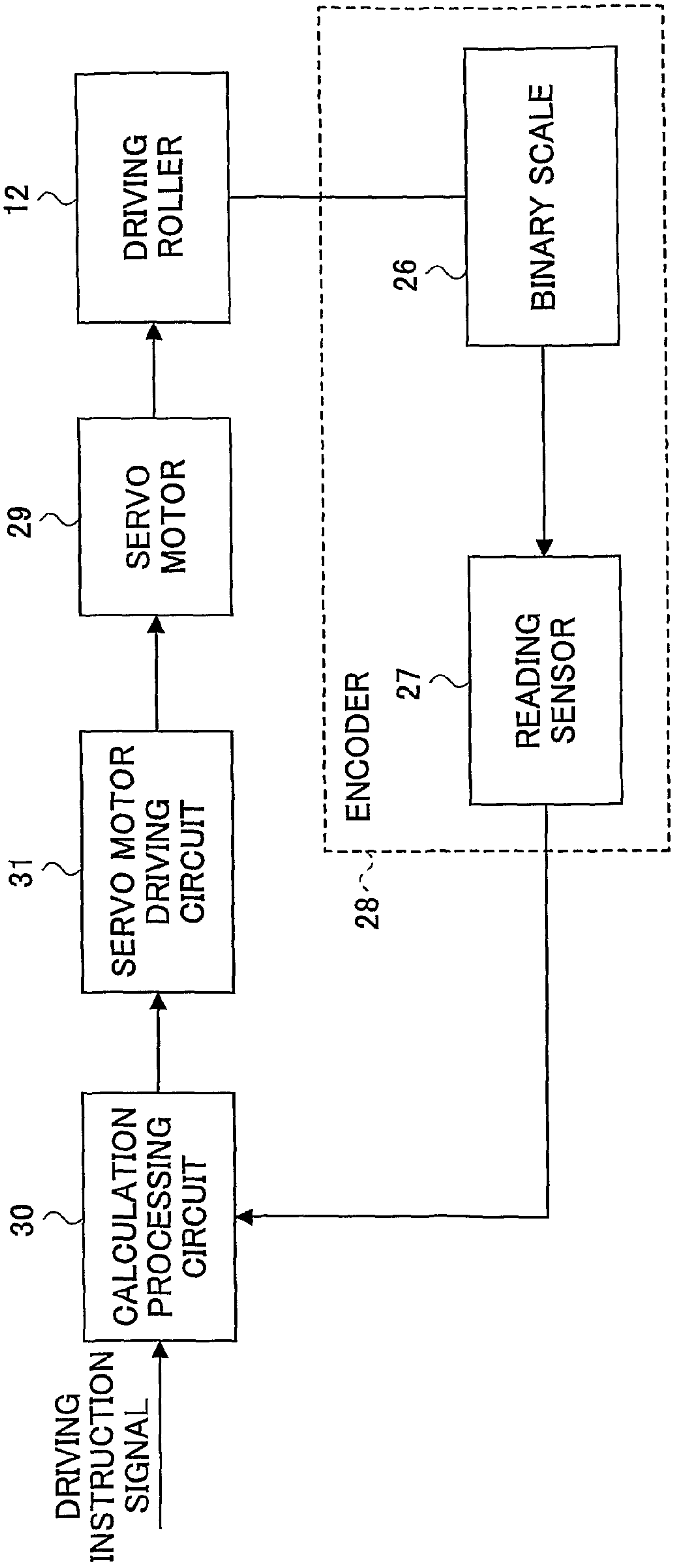
FIG. 24 shows a block diagram of a driving system.

As shown in a block diagram in FIG. 24, after the transmission of a driving instruction signal, a pulse signal output from the reading sensor 27 is transmitted to a calculation processing circuit 30 that calculates the rotational speed of a servo motor 29 for rotating the driving roller 12. Then, the calculation processing circuit 30 calculates the feeding speed of the conveyance belt 14 and transmits the signal of the calculated feeding speed to a servo motor driving circuit 31 that drives the servo motor 29, thereby controlling the rotational speed of the servo motor 29 at a constant speed to rotate the driving roller 12.

By controlling the rotational speed of the servo motor 29 that rotates the driving roller 12 in this manner, it is possible to accurately control the conveyance amount of the recording sheet 17 attracted and held onto the conveyance belt 14.

The pitch of the binary scale 27 provided at the conveyance belt 14 of the encoder 28 that detects the feeding amount of the conveyance belt 14 is directly used as the unit of sheet feeding accuracy.

Furthermore, when the recording sheet 17 is conveyed to form images thereon, the line feeding amount of feeding the recording sheet 17 corresponds to the minimum unit of the maximum resolution of the ink jet printer 1.

For example, assuming that the maximum resolution of the ink jet printer 1 is 1200 dpi, the minimum unit for feeding a sheet determined by the maximum resolution is 25.4 mm/1200=21.2 μm/n. Therefore, the pitch of the binary scale 27, i.e., a control unit is set to 21.2 μm/n. Note, however, that n is an integer of one or larger. For example, assuming that n=2, the pitch of the binary scale 27 is 10.6 μm/n. Even if there occurs a shift by one pulse when the feeding amount of the conveyance belt 14 is controlled by the pulse signal generated by reading the binary scale 27, the influence on the images to be formed on the recording sheet 17 is prevented, thereby making it possible to stably form excellent quality images.

Figure 25:
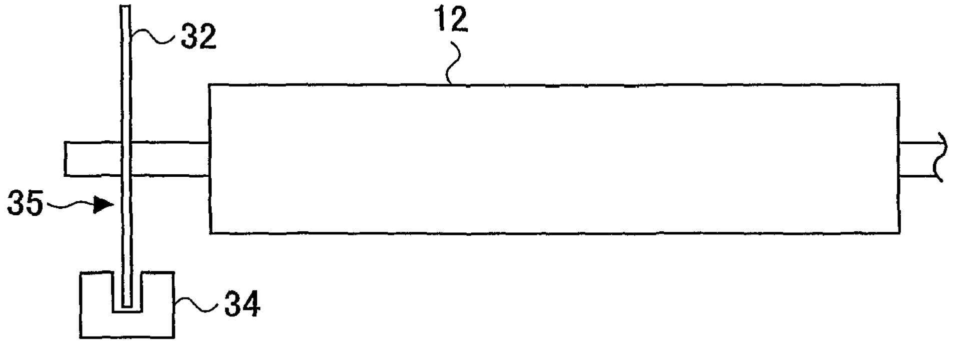
FIG. 25 shows a schematic configuration view of parts around a driving roller.
Figure 26A:
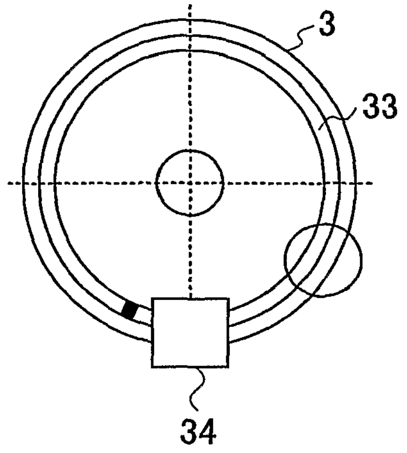
FIGS. 26A and 26B show a schematic view of the reading sensor that detects the rotational amount of the driving roller and a schematic enlarged view of a scale, respectively.
Figure 26B:
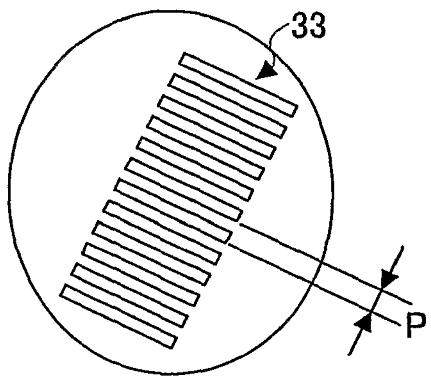

Furthermore, as shown in FIG. 25, in order to indirectly detect the feeding speed or the feeding amount of the conveyance belt 14, a rotary encoder 35 may be used to detect the rotational amount of the driving roller 12 to calculate the feeding speed or the feeding amount of the conveyance belt 14. The rotary encoder 35 includes a circular disk 32, a scale 33, and a transmissive or reflective reading sensor 34. The circular disk 32 is provided on the rotary shaft of the driving roller 12 that conveys the conveyance belt 14, as shown in FIG. 25. The scale 33 has pitches arranged on the circular disk 32 in the circumferential direction at a constant interval, as shown in a front view in FIG. 26A and an enlarged view in FIG. 26B. The reading sensor 34 reads the scale 33.

Generally, a rotary encoder has a scale pitch P of 100 LPI, 150 LPI, 200 LPI, 300 LPI, etc.

A known rotary encoder outputs pulses four times as many as an actual scale pulse.

In the case of the scale 33 having 2400 lines per rotation, the reading sensor 34 allowing the above-mentioned four fold output can output 9600 pulses.

Furthermore, when the recording sheet 17 is conveyed to have images formed thereon, the line feeding amount of feeding the recording sheet 17 corresponds to the minimum unit of the maximum resolution of the ink jet printer 1.

For example, assuming that the maximum resolution is 600 dpi, the minimum unit of the feeding amount is determined as 25.4 mm/600=42.3 μm. Actually, the recording sheet is fed by an integral multiple of 42.3 μm.

In the ink jet printer 1, the feeding amount of the conveyance belt 14 is determined according to its maximum resolution.

For example, assuming that the driving roller 12 that conveys the conveyance belt 14 is controlled based on a fourfold signal output by the rotary encoder 35 including the scale 33 having 2400 lines per rotation, the number of output pulses per rotation output by the rotary encoder 35 is 2400×4=9600 pulses.

Assuming that the maximum resolution of the inkjet printer 1 is 1200 dpi, a feeding amount corresponding to one output pulse is 25.4 mm/1200=21.2 μm.

Because one rotation of the driving roller 12 leads to one rotation of the circular disk 32 having the scale 33, the diameter of the driving roller 12 is calculated to be 64.5 mm based on the relational expression, (diameter of the driving roller×π)/9600=21.2 μm.

In other words, using the driving roller 12 having the diameter of 64.5 mm and providing the rotary encoder 35 including the scale 33 having 2400 lines on the rotary shaft of the driving roller 12 make the feeding amount corresponding to one pulse 21.2 Mm.

Instead of outputting the feeding amount of 21.2 μm obtained according to the maximum resolution for each pulse, it is preferable that the diameter of the driving roller 12 be determined such that a feeding amount per pulse of the rotary encoder 35 becomes a value obtained by dividing the feeding amount of 21.2 μm determined according to the maximum resolution by n (n is an integer of two or larger). For example, assuming that n is 2, the diameter of the driving roller 12 is calculated to be 32.4 mm based on the relational expression, (diameter of the driving roller×π)/9600=10.6 μm.

In other words, using the driving roller 12 having the diameter of 32.4 mm and providing the rotary encoder 35 including the scale 33 having 2400 lines on the rotary shaft of the driving roller 12 make the feeding amount corresponding to one pulse 10.6 μm.

Accordingly, even if there occurs a shift by one pulse in the feeding amount of the driving roller 12, the influence on the images to be formed on the recording sheet 17 is prevented, thereby making it possible to stably form excellent quality images.

Figure 27A:
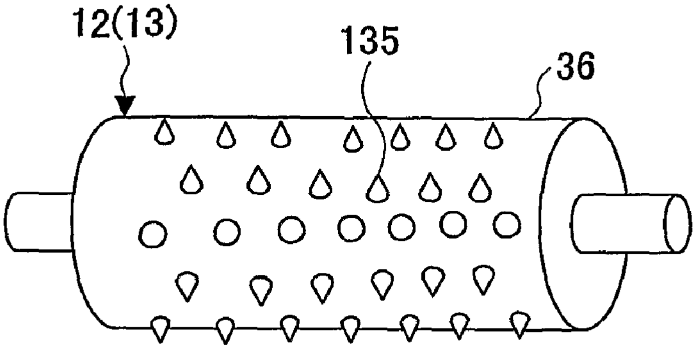
FIGS. 27A and 27B show a schematic perspective view of a grip roller and a schematic perspective view of the conveyance belt as a timing belt, respectively.
Figure 27B:
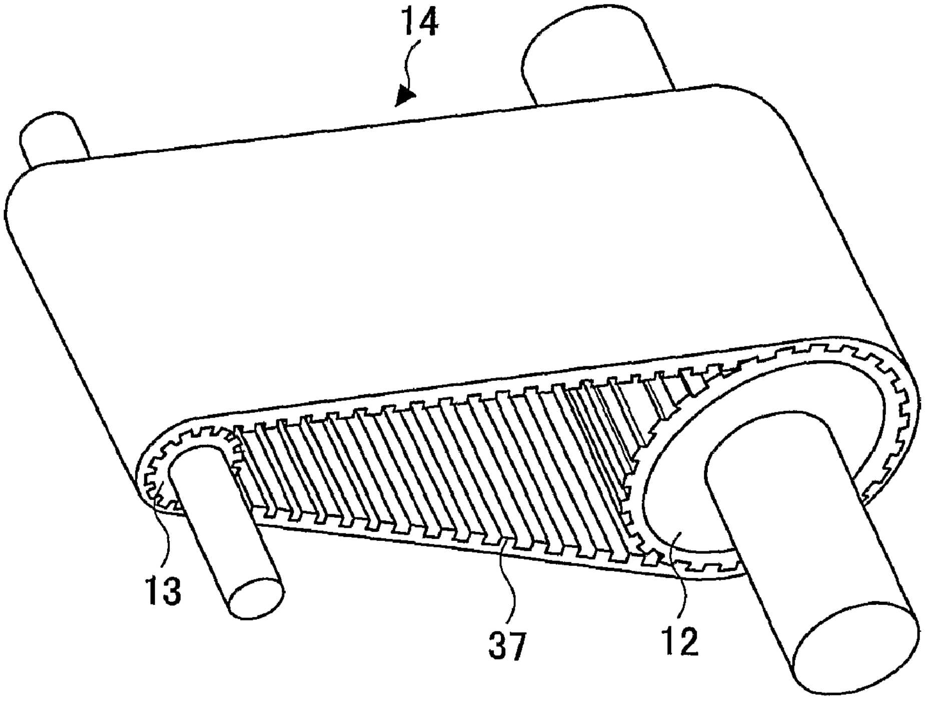

Furthermore, a slip prevention mechanism may be provided between the driving roller 12 and the conveyance belt 14. For example, as shown in FIG. 27A, both of the driving roller 12 and the driven roller 13, or only the driving roller 12 may be formed as a grip roller 36 having plural projections 135 on its surface. Also, as shown in FIG. 27B, the conveyance belt 14 is formed by a timing belt 37. Accordingly, these slip prevention mechanisms reliably prevent the conveyance belt 14 from slipping on the driving roller 12 or the driven roller 13 so that the recording sheet 17 can be controlled to stop at an accurate position when images are formed on the recording sheet 17 and also can be conveyed in reverse with high accuracy.

Figure 28A:
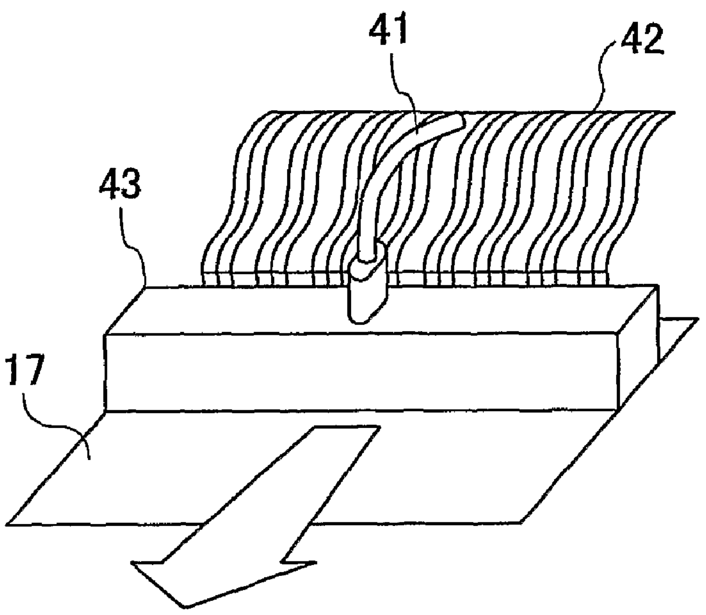
FIGS. 28A and 28B show a schematic perspective view of a line ink jet printer and a schematic view of a line head, respectively.
Figure 28B:
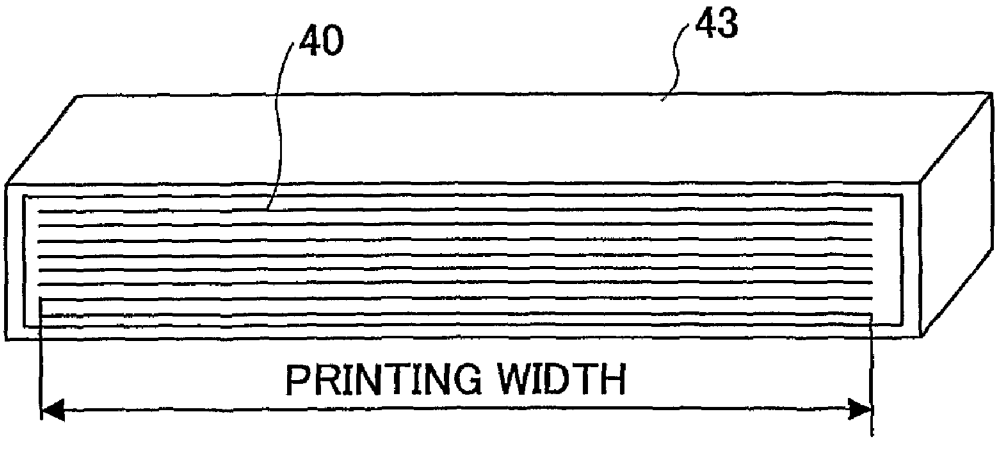
Figure 29:
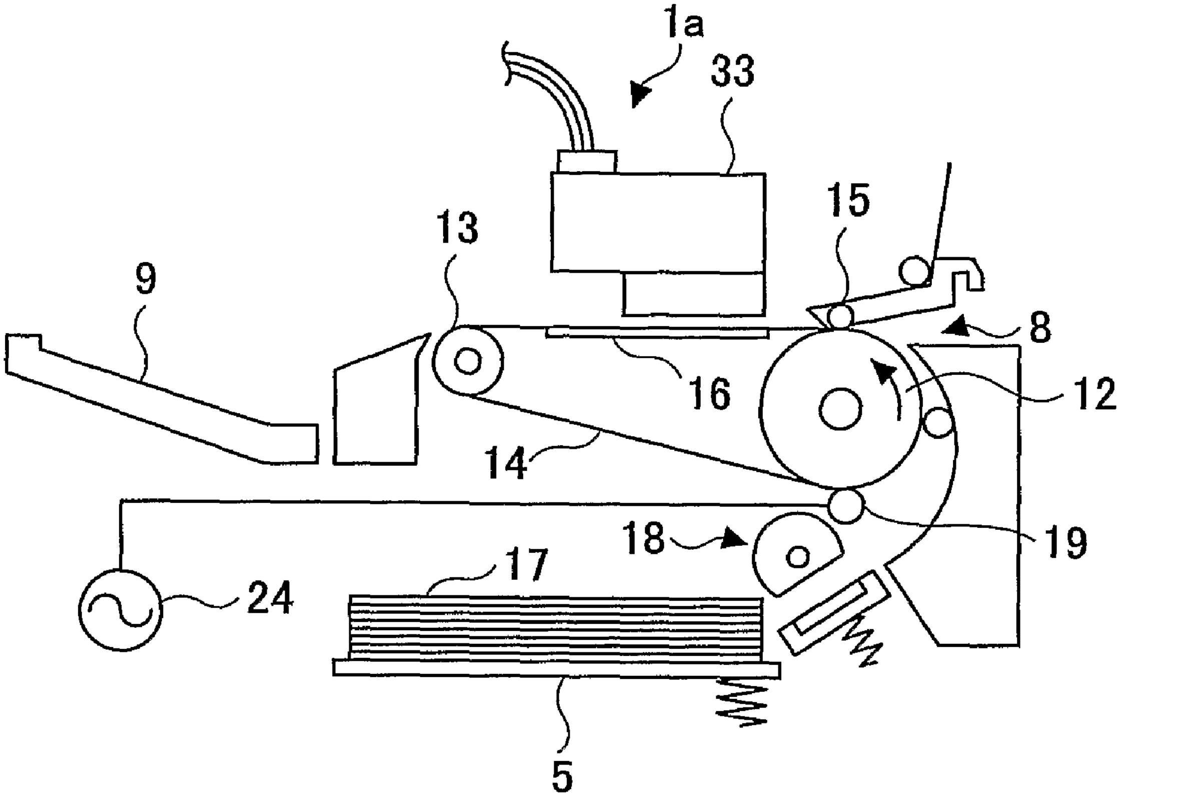
FIG. 29 shows a schematic configuration view of the image forming apparatus.

Furthermore, although the above description refers to the serial ink jet printer 1, the recording sheet conveyance apparatus 8 is similarly applicable to a line inkjet printer 1*a* using a line head 43. As shown in a perspective view of the line head in FIG. 28A and a front view of nozzle lines in FIG. 28B, a line head 43 has nozzle lines 40 extending from side to side in the entire width direction of the recording sheet 17 so as to eject ink droplets supplied from an ink supplying tube 41 throughout the printable width of the recording sheet 17 according to a driving signal output from head driving signal lines 42. As shown in a configuration view in FIG. 29, the recording sheet conveyance apparatus 8 is similarly applicable to the line inkjet printer 1*a* using the line head 43 and the recording sheet 17 is electrostatically attracted onto the conveyance belt 14 and then conveyed. Accordingly, the recording sheet 17 can be stably conveyed by the printing part and high-quality images can be stably formed with a more accurate line feeding speed.

The above description refers to the conveyance belt of an electrostatic attraction type, but a method of closely attaching a recording sheet 17 is not limited to this.

For example, air may be suctioned from a suction hole formed in a conveyance belt so that the recording sheet 17 is closely attached, or the recording sheet 17 may be pressed with a roller from the above.

The present invention is not limited to the specifically disclosed embodiment, but variations and expansions may be made without departing from the scope of the present invention.

The present application is based on Japanese Priority Application No. 2007-196252 filed on Jul. 27, 2007, with the Japanese Patent Office, the entire contents of which are hereby Incorporated by reference.

The invention claimed is:

1. An image forming apparatus that forms an image based on a control signal from an image processing controlling unit that processes input image information into image data, the apparatus comprising:

a carriage that moves in a main scanning direction in accordance with the control signal;

a conveyance unit that conveys a recording medium in a sub-scanning direction;

an output detection unit that detects motor outputs of the carriage at any plural points when the carriage moves at a constant speed; and a jamming determination unit that compares an average value of the motor outputs of the carriage between the plural points with a predetermined tolerance, compares a most frequent value of the motor outputs of the carriage between the plural points with a predetermined tolerance, or compares a difference between a maximum value and a minimum value of the motor outputs of the carriage between the plural points with a predetermined tolerance, thereby determining a conveyance failure.

2. The image forming apparatus according to claim 1, wherein the determination of the conveyance failure with the jamming determination unit is performed based on either a history of values of the motor outputs until any point during movement of the carriage at a constant speed or the history of the values of the motor outputs after the movement of the carriage at the constant speed.

3. The image forming apparatus according to claim 1, wherein an occurrence of jamming of the carriage is determined when the number of times determined as the conveyance failure by the jamming determination unit is equal to or greater than a predetermined number.

4. The image forming apparatus according to claim 2, wherein the tolerance is set by appropriately combining a fluctuation in the values of the motor outputs when the carriage is caused to perform idle driving, an external environment, time degradation, and the history of the values of the motor output.

5. An image forming method comprising:

moving a carriage in a main scanning direction based on a control signal from an image processing controlling unit that processes input image information into image data and conveying a recording medium in a sub-scanning direction to perform printing;

detecting motor outputs of the carriage at any plural points when the carriage moves at a constant speed; and determining jamming by comparing an average value of the motor outputs of the carriage between the plural points with a predetermined tolerance to determine a conveyance failure.

6. A non-transitory computer readable medium having stored thereon a conveyance failure detection program applied to an image forming apparatus having a carriage that moves in a main scanning direction based on a control signal from an image processing controlling unit that processes input image information into image data, a conveyance unit that conveys a recording medium in a sub-scanning direction, an output detection unit that detects motor outputs of the carriage, and a jamming determination unit, the program comprising:

an instruction system that causes the output detection unit to detect the motor outputs of the carriage at any plural points when the carriage moves at a constant speed, and causes the jamming determination unit to compare an average value of the motor outputs of the carriage between the plural points with a predetermined tolerance to determine a conveyance failure.

* * * * *